United States Patent
Takahashi

(10) Patent No.: US 9,646,218 B2
(45) Date of Patent: May 9, 2017

(54) IMAGE-PROCESSING APPARATUS, DATE IDENTIFICATION APPARATUS, IMAGE-PROCESSING METHOD, AND COMPUTER PROGRAM PRODUCT

(71) Applicant: PFU Limited, Ishikawa (JP)

(72) Inventor: Akifumi Takahashi, Ishikawa (JP)

(73) Assignee: PFU LIMITED, Ishikawa (JP)

(*) Notice: Subject to any disclaimer, the term of this patent is extended or adjusted under 35 U.S.C. 154(b) by 0 days.

(21) Appl. No.: 14/879,000

(22) Filed: Oct. 8, 2015

(65) Prior Publication Data
US 2016/0371557 A1 Dec. 22, 2016

(30) Foreign Application Priority Data
Jun. 18, 2015 (JP) ................................ 2015-123211

(51) Int. Cl.
G06K 9/34 (2006.01)
G06K 9/46 (2006.01)
G06K 9/62 (2006.01)

(52) U.S. Cl.
CPC ............. *G06K 9/344* (2013.01); *G06K 9/348* (2013.01); *G06K 9/4652* (2013.01); *G06K 9/6215* (2013.01)

(58) Field of Classification Search
CPC ........ G06K 9/46; G06K 9/3208; G06K 9/344; G06K 9/348; G06K 9/6215
(Continued)

(56) References Cited

U.S. PATENT DOCUMENTS 3,815,354 A * 6/1974 Strocka .................... G04G 9/12
307/38
4,142,182 A * 2/1979 Kmetz .................... G02F 1/133
345/204

(Continued)

FOREIGN PATENT DOCUMENTS

JP 61-163475 A 7/1986
JP 07-230526 A 8/1995
(Continued)

OTHER PUBLICATIONS

Decision to Grant issued in corresponding Japanese Patent Application No. 2015-123211, dated Aug. 23, 2016.
(Continued)

*Primary Examiner* — Kanjibhai Patel
(74) *Attorney, Agent, or Firm* — McDermott Will & Emery LLP

(57) ABSTRACT

An image-processing apparatus identifies a numeral recognition target range in an image, extracts, when a circumscribed rectangle of a numeral likelihood portion that is likely to represent a numeral in the numeral recognition target range conforms to a reference size, the circumscribed rectangle, extracts, when a plurality of circumscribed rectangles extracted are arrayed, the arrayed circumscribed rectangles, determines whether the circumscribed rectangles extracted each include one or both of a horizontal line and a vertical line, each of the horizontal line and the vertical line constituting a segment in a multiple-segment character, and extracts, as a target area for numeral identification, the circumscribed rectangle that includes one or both of the horizontal line and the vertical line, and isolates a numeral display area from the numeral recognition target range so as to include the target area in a predetermined direction.

19 Claims, 23 Drawing Sheets

(58) Field of Classification Search
USPC .................................................. 382/164, 177
See application file for complete search history.

(56) References Cited

U.S. PATENT DOCUMENTS

| | | | | |
|---|---|---|---|---|
| 6,593,901 | B1 * | 7/2003 | Kitazawa ............. | G04G 9/0023 345/4 |
| 2003/0193842 | A1 * | 10/2003 | Harrison ................ | G04B 25/00 368/82 |
| 2013/0175340 | A1 * | 7/2013 | Endo ........................ | G06K 5/00 235/437 |

FOREIGN PATENT DOCUMENTS

| | | |
|---|---|---|
| JP | 09-044605 A | 2/1997 |
| JP | 09-305702 A | 11/1997 |

OTHER PUBLICATIONS

Hiroyuki Hasegawa et al., "Development of Slab Number Recognition System", Iron and Steel Institute of Japan collected papers materials and process, vol. 13, No. 2, 2000, p. 214.

\* cited by examiner

|  | ANY OBJECT OTHER THAN "1" | "1" |
|---|---|---|
| REFERENCE SIZE | 40×60 | 10×30 TO 60 |
| RATIO (x:y) | 2:3 | 1:3 TO 6 |

FIG.37
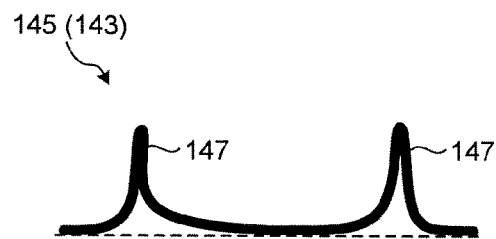
FIG.38
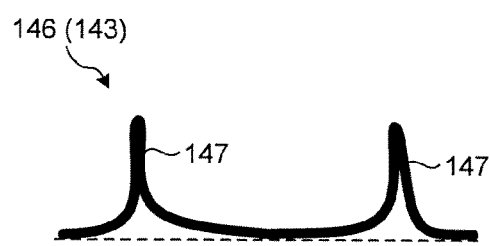
FIG.39
|       | 1  | 2  | 3  | 4  | 5  | 6  | 7  | 8  | 9  | 0  |
|-------|----|----|----|----|----|----|----|----|----|----|
| LINE C | 0  | 3  | 3  | 1  | 3  | 3  | 1  | 3  | 3  | 2  |
| LINE D | 1R | 1R | 1R | 2  | 1L | 1L | 1R | 2  | 2  | 2  |
| LINE E | 1R | 1L | 1R | 1R | 1R | 2  | 1R | 2  | 1R | 2  |

IMAGE-PROCESSING APPARATUS, DATE IDENTIFICATION APPARATUS, IMAGE-PROCESSING METHOD, AND COMPUTER PROGRAM PRODUCT

CROSS-REFERENCE TO RELATED APPLICATION

This application is based upon and claims the benefit of priority from Japanese Patent Application No. 2015-123211, filed on Jun. 18, 2015, the entire contents of which are incorporated herein by reference.

BACKGROUND OF THE INVENTION

1. Field of the Invention

The present disclosure relates to an image-processing apparatus, a date identification apparatus, an image-processing method, and a computer program product.

2. Description of the Related Art

Techniques are disclosed that recognize numerals in an image.

A disclosed technique determines a combination of separated characters using uniformity of the width and height of a rectangle, uniformity of a distance between rectangles, and a grammar dictionary (see JP-A-9-44605).

Another disclosed technique determines a character area using, when two areas are adjacent to each other in a horizontal direction (or a vertical direction), the height (or width) of a circumscribed rectangle in each area and the number of areas present between the two areas (see JP-A-9-305702).

However, the known image analyzing apparatus (e.g., JP-A-9-44605), which extracts a character on the basis of the height or width of the circumscribed rectangle of a character candidate, has difficulty in recognizing numerals efficiently and accurately with a small amount of calculations. Moreover, because of its wide recognition range, the known image analyzing apparatus needs to perform a large amount of calculations, and thus takes a longer processing time and has a large amount of erroneous recognition.

SUMMARY OF THE INVENTION

It is an object of the present disclosure to at least partially solve the problems in the conventional technology.

An image-processing apparatus according to one aspect of the present disclosure includes a target range identifying unit that identifies a numeral recognition target range in an image, a rectangle extracting unit that extracts, when a circumscribed rectangle of a numeral likelihood portion that is likely to represent a numeral in the numeral recognition target range conforms to a reference size, the circumscribed rectangle, a plurality extracting unit that extracts, when a plurality of circumscribed rectangles extracted by the rectangle extracting unit are arrayed, the arrayed circumscribed rectangles, a target area extracting unit that determines whether the circumscribed rectangles extracted by the plurality extracting unit each include one or both of a horizontal line and a vertical line, each of the horizontal line and the vertical line constituting a segment in a multiple-segment character, and extracts, as a target area for numeral identification, the circumscribed rectangle that includes one or both of the horizontal line and the vertical line, and a display area isolating unit that isolates a numeral display area from the numeral recognition target range so as to include the target area in a predetermined direction.

A date identification apparatus according to another aspect of the present disclosure includes a target range identifying unit that identifies a date recognition target range in an image, a binarizing unit that binarizes date recognition target range data of the date recognition target range using a threshold based on luminance and hue, to acquire binarizing range data, a rectangle extracting unit that subjects the binarizing range data to labeling to extract, in a binarizing range based on the binarizing range data, a numeral likelihood portion that is likely to represent a numeral and, when a circumscribed rectangle of the numeral likelihood portion conforms to a reference size, extracts the circumscribed rectangle, a plurality extracting unit that extracts, when a plurality of circumscribed rectangles extracted by the rectangle extracting unit are arrayed, the arrayed circumscribed rectangles, a target area extracting unit that determines whether the circumscribed rectangles extracted by the plurality extracting unit each include one or both of a horizontal line and a vertical line, each of the horizontal line and the vertical line constituting a segment in a multiple-segment character, and extracts as a target area for numeral identification the circumscribed rectangle that includes one or both of the horizontal line and the vertical line, a display area isolating unit that isolates a date display area from the date recognition target range so as to include the target area in a predetermined direction, a numeral identifying unit that performs a histogram on date display area data of the date display area using a plurality of lines and identifies the numeral on a basis of a peak count in each of the lines, and a numeral data assigning unit that assigns date data of the numeral to image data of the image.

An image-processing method according to still another aspect of the present disclosure includes a target range identifying step of identifying a numeral recognition target range in an image, a rectangle extracting step of extracting, when a circumscribed rectangle of a numeral likelihood portion that is likely to represent a numeral in the numeral recognition target range conforms to a reference size, the circumscribed rectangle, a plurality extracting step of extracting, when a plurality of circumscribed rectangles extracted at the rectangle extracting step are arrayed, the arrayed circumscribed rectangles, a target area extracting step of determining whether the circumscribed rectangles extracted at the plurality extracting step each include one or both of a horizontal line and a vertical line, each of the horizontal line and the vertical line constituting a segment in a multiple-segment character, and extracting, as a target area for numeral identification, the circumscribed rectangle that includes one or both of the horizontal line and the vertical line, and a display area isolating step of isolating a numeral display area from the numeral recognition target range so as to include the target area in a predetermined direction.

A computer program product according to still another aspect of the present disclosure is a computer program product having a non-transitory tangible computer readable medium including programmed instructions for causing, when executed by a computer, the computer to perform an image-processing method comprising a target range identifying step of identifying a numeral recognition target range in an image, a rectangle extracting step of extracting, when a circumscribed rectangle of a numeral likelihood portion that is likely to represent a numeral in the numeral recognition target range conforms to a reference size, the circumscribed rectangle, a plurality extracting step of extracting, when a plurality of circumscribed rectangles extracted at the rectangle extracting step are arrayed, the arrayed circumscribed rectangles, a target area extracting step of determining whether the circumscribed rectangles extracted at the plurality extracting step each include one or both of a horizontal line and a vertical line, each of the horizontal line and the vertical line constituting a segment in a multiple-segment character, and extracting, as a target area for numeral identification, the circumscribed rectangle that includes one or both of the horizontal line and the vertical line, and a display area isolating step of isolating a numeral display area from the numeral recognition target range so as to include the target area in a predetermined direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 37 is an illustration for illustrating a histogram performed on the target area data using a projection line;

FIG. 38 is an illustration for illustrating a histogram performed on the target area data using a projection line;

FIG. 39 is a figure illustrating a relation between peak portions of the projection histogram and a numeral when the numeral is to be identified on the basis of the peak portions;

DETAILED DESCRIPTION OF THE PREFERRED EMBODIMENTS

The following explains in detail an image-processing apparatus, a date identification apparatus, an image-processing method, and a computer program product according to an embodiment of the present disclosure with reference to the accompanying drawings. The embodiment does not limit the present disclosure.

Configuration of Embodiment

An exemplary configuration of an image-processing apparatus 200 according to the embodiment of the present disclosure will be explained below with reference to FIGS. 1 and 2, and processing and the like in the embodiment will thereafter be explained in detail. The embodiment explained hereunder simply exemplifies the image-processing apparatus 200 for embodying a technical idea of the present disclosure. The embodiment does not intend to limit the present disclosure only to the image-processing apparatus 200 and is, instead, equally applicable to the image-processing apparatus 200 in other embodiments included in the scope of the disclosure.

For example, the functional distribution of the image-processing apparatus 200 exemplified in the embodiment is not limited to the following description, and the image-processing apparatus 200 may be configured through functional or physical distribution and integration of the functions in any given unit within the scope in which similar effects and functions can be achieved. FIGS. 1 and 2 are block diagrams of exemplary configurations of the image-processing apparatus 200 according to the embodiment.

First Configuration

Figure 1:
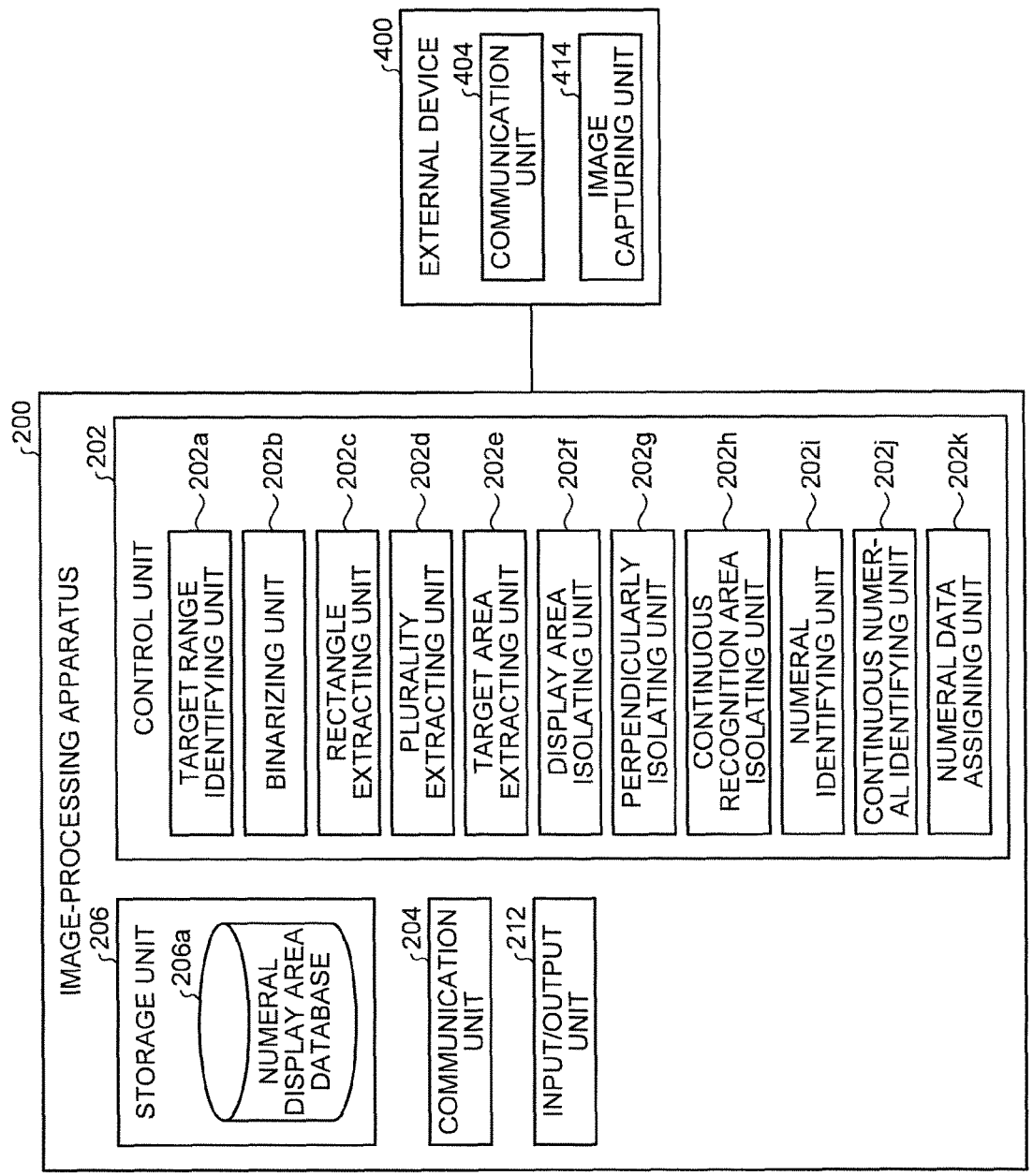
FIG. 1 is a block diagram of an exemplary configuration of an image-processing apparatus according to an embodiment of the present disclosure.

As shown in FIG. 1, the image-processing apparatus 200 generally includes a control unit 202, a communication unit 204, a storage unit 206, and an input/output unit 212. The image-processing apparatus 200 is connected to an external device 400 (e.g., a digital camera or a scanner) so as to be capable of communicating with each other. The image-processing apparatus 200 may be connected to the external device 400 via the communication unit 204 so as to be capable of communicating with each other.

These components of the image-processing apparatus 200 are connected via any communication path so as to be capable of communicating with each other. The control unit 202 may control the communication unit 204 and the input/output unit 212.

The communication unit 204 may have a function of performing wireless communication through Bluetooth (a registered trademark), near field communication (NFC), infrared communication, or the like.

The communication unit 204 is one or both of an antenna and an interface (a NIC or the like), in which the antenna is connected to one or both of a communication line and a telephone line and the interface is connected to a communication device such as a router. The communication unit 204 may have a function of controlling communication between the image-processing apparatus 200 and the network. The network may include remote communication or the like of one or both of wire communication and wireless communication (e.g., WiFi).

The input/output unit 212 may have a function of performing input/output (I/O) of data. The input/output unit 212 may, for example, be a key input unit, a touch panel, a control pad (e.g., a touch pad and a game pad), a mouse, a keyboard, and a microphone.

Alternatively, the input/output unit 212 may be a display unit (e.g., a display, a monitor, and a touch panel formed of a liquid crystal, organic EL, or the like) that displays (input/output) information on an application and the like. Still alternatively, the input/output unit 212 may be a sound output unit (e.g., a speaker) that outputs sound information as voice.

Additionally, as shown in FIG. 1, the external device 400 connected to the image-processing apparatus 200 so as to be capable of communicating with each other may generally include a communication unit 404 and an image capturing unit 414.

The communication unit 404 may have a function of performing wireless communication through Bluetooth (a registered trademark), NFC, infrared communication, or the like. The communication unit 404 is one or both of an antenna and an interface (a NIC or the like), in which the antenna is connected to one or both of a communication line and a telephone line, and the interface is connected to a communication device such as a router. The communication unit 404 may have a function of controlling communication between the external device 400 and the network.

The image capturing unit 414 may be a planar array of image capturing elements, such as CCD image sensors or CMOS image sensors. The image capturing unit 414 may be configured to simultaneously capture images of objects within an image capturing range using the image capturing elements arrayed planarly.

The storage unit 206 stores, for example, various types of databases, and one or both of tables and files (e.g., a numeral display area database 206a). The storage unit 206 may store image data (for example, image data captured by the external device 400). The storage unit 206 may store various types of application programs (for example, a user application).

The storage unit 206 is a storage. For example, any one of the following may be used for the storage unit 206: a memory such as a RAM and a ROM, a fixed disk drive such as a hard disk, a solid state drive (SSD), a flexible disk, and an optical disc. The storage unit 206 records, for example, a computer program that gives commands to a central processing unit (CPU) to thereby cause the CPU to perform various types of processing.

The numeral display area database 206a, among other elements that constitute the storage unit 206, stores numeral display area data of a numeral display area in an image in which the numeral display area is identified.

The control unit 202 includes, for example, a CPU that integrally controls the image-processing apparatus 200. The control unit 202 has an internal memory that stores a control program, a program that specifies various types of processing steps and the like, and required data. The control unit 202 performs information processing for executing various types of processing in accordance with these programs. Additionally, the control unit 202 may store the image data in the storage unit 206.

The control unit 202 generally includes a target range identifying unit 202a, a binarizing unit 202b, a rectangle extracting unit 202c, a plurality extracting unit 202d, a target area extracting unit 202e, a display area isolating unit 202f, a perpendicularly isolating unit 202g, a continuous recognition area isolating unit 202h, a numeral identifying unit 202i, a continuous numeral identifying unit 202j, and a numeral data assigning unit 202k.

The target range identifying unit 202a identifies a numeral recognition target range in an image. The target range identifying unit 202a may search for a rectangular range included in the image to thus identify the rectangular range as the numeral recognition target range.

Alternatively, the target range identifying unit 202a may identify a specified range specified by a user or a predetermined set range as the numeral recognition target range. Still alternatively, the target range identifying unit 202a may identify a date recognition target range in the image.

The binarizing unit 202b binarizes numeral recognition target range data of the numeral recognition target range using a threshold based on luminance and hue, to thereby acquire binarizing range data. Alternatively, the binarizing unit 202b may binarize date recognition target range data of the date recognition target range using the threshold based on luminance and hue, to thereby acquire the binarizing range data.

When, in the numeral recognition target range, a circumscribed rectangle of a numeral likelihood portion that is likely to represent a numeral conforms to a reference size, the rectangle extracting unit 202c extracts the circumscribed rectangle.

In this case, the rectangle extracting unit 202c may subject the binarizing range data to labeling to thereby extract, in the binarizing range based on the binarizing range data, the numeral likelihood portion that is likely to represent a numeral. When the circumscribed rectangle of the numeral likelihood portion conforms to the reference size, the rectangle extracting unit 202c extracts the circumscribed rectangle.

When a plurality of circumscribed rectangles are arrayed as extracted by the rectangle extracting unit 202c, the plurality extracting unit 202d extracts the arrayed circumscribed rectangles. When a plurality of circumscribed rectangles having an identical height or width are arrayed, the plurality extracting unit 202d may extract the circumscribed rectangles having the identical height or width. Alternatively, when the circumscribed rectangles having the identical height or width are arrayed, the plurality extracting unit 202d may extract circumscribed rectangles that constitute a circumscribed rectangle group.

The target area extracting unit 202e determines whether the circumscribed rectangles extracted by the plurality extracting unit 202d each include one or both of a horizontal line and a vertical line, each of the horizontal line and the vertical line constituting a segment in a multiple-segment character. The target area extracting unit 202e thereby extracts the circumscribed rectangle that includes one or both of the horizontal line and the vertical line as a target area for numeral identification.

In this case, the target area extracting unit 202e may determine whether the circumscribed rectangles extracted by the plurality extracting unit 202d each include a horizontal line that constitutes an upper-end, middle, or lower-end segment of the multiple-segment character and extract a circumscribed rectangle that includes the horizontal line as the target area for numeral identification for numerals 0 and 2 to 9.

Additionally, when a circumscribed rectangle conforms to the reference size set for numeral 1, the target area extracting unit 202e may extract the circumscribed rectangle as the target area for numeral identification for numeral 1.

The display area isolating unit 202f isolates the numeral display area from the numeral recognition target range so as to include the target area in a predetermined direction. In this case, the display area isolating unit 202f may isolate a date display area from the date recognition target range so as to include the target area in a predetermined direction.

The perpendicularly isolating unit 202g identifies, in the numeral display area, both extreme positions in a predetermined direction as a target for numeral identification and isolates, at the both extreme positions, an isolated numeral display area perpendicularly to the predetermined direction. In this case, the perpendicularly isolating unit 202g may isolate, at the both extreme positions, the isolated numeral display area in a direction different from the predetermined direction (for example, in parallel with a segment (vertical line) that forms part of the multiple-segment character when the multiple-segment character is an italic).

In this case, when the numeral display area includes an area in which one or both of the number of the circumscribed rectangles and the distance between the circumscribed rectangles satisfy predetermined values, the perpendicularly isolating unit 202g may identify, as the both extreme positions, the circumscribed rectangles in the area that are disposed at both extremes in the predetermined direction and isolate the isolated numeral display area perpendicularly to the predetermined direction at the both extreme positions.

Alternatively, when one or both of a predetermined prefix and a predetermined suffix are present in the numeral display area, the perpendicularly isolating unit 202g may identify the both extreme positions (the circumscribed rectangles disposed at both extremes in the predetermined direction) on the basis of one or both of the prefix and the suffix and isolate the isolated numeral display area perpendicularly to the predetermined direction at the both extreme positions.

Still alternatively, when a predetermined delimiter is present in the numeral display area, the perpendicularly isolating unit 202g may identify the both extreme positions (the circumscribed rectangles disposed at both extremes in the predetermined direction) on the basis of the delimiter and isolate the isolated numeral display area perpendicularly to the predetermined direction at the both extreme positions. Still alternatively, the perpendicularly isolating unit 202g may identify the both extreme positions in a predetermined direction as a target for numeral identification and isolate an isolated date display area perpendicularly to the predetermined direction at the both extreme positions.

The continuous recognition area isolating unit 202h isolates, as a continuous recognition area, an area that corresponds, in an image in which the numeral display area is not identified, to the numeral display area or the isolated numeral display area based on the numeral display area data stored in the numeral display area database 206a.

The numeral identifying unit 202i identifies a numeral from the numeral display area or the isolated numeral display area. In this case, the numeral identifying unit 202i may perform a histogram on the numeral display area data of the numeral display area or the isolated numeral display area using a plurality of lines and identify a numeral on the basis of a peak count in each of the lines.

Alternatively, the numeral identifying unit 202i may identify a numeral from the numeral display area or the isolated numeral display area through OCR. Still alternatively, the numeral identifying unit 202i may perform a histogram on the date display area data of the date display area or the isolated date display area using a plurality of lines and identify a numeral on the basis of a peak count in each of the lines.

The continuous numeral identifying unit 202j identifies a numeral from the continuous recognition area. In this case, the continuous numeral identifying unit 202j may identify a numeral from the continuous recognition area through OCR. Alternatively, the continuous numeral identifying unit 202j may perform a histogram on the numeral display area data of the continuous recognition area using a plurality of lines and identify a numeral on the basis of a peak count in each of the lines.

The numeral data assigning unit 202k assigns numeral data of a numeral to image data of an image. In this case, the numeral data assigning unit 202k may assign date data of the numeral to the image data of the image.

Second Configuration

Figure 2:
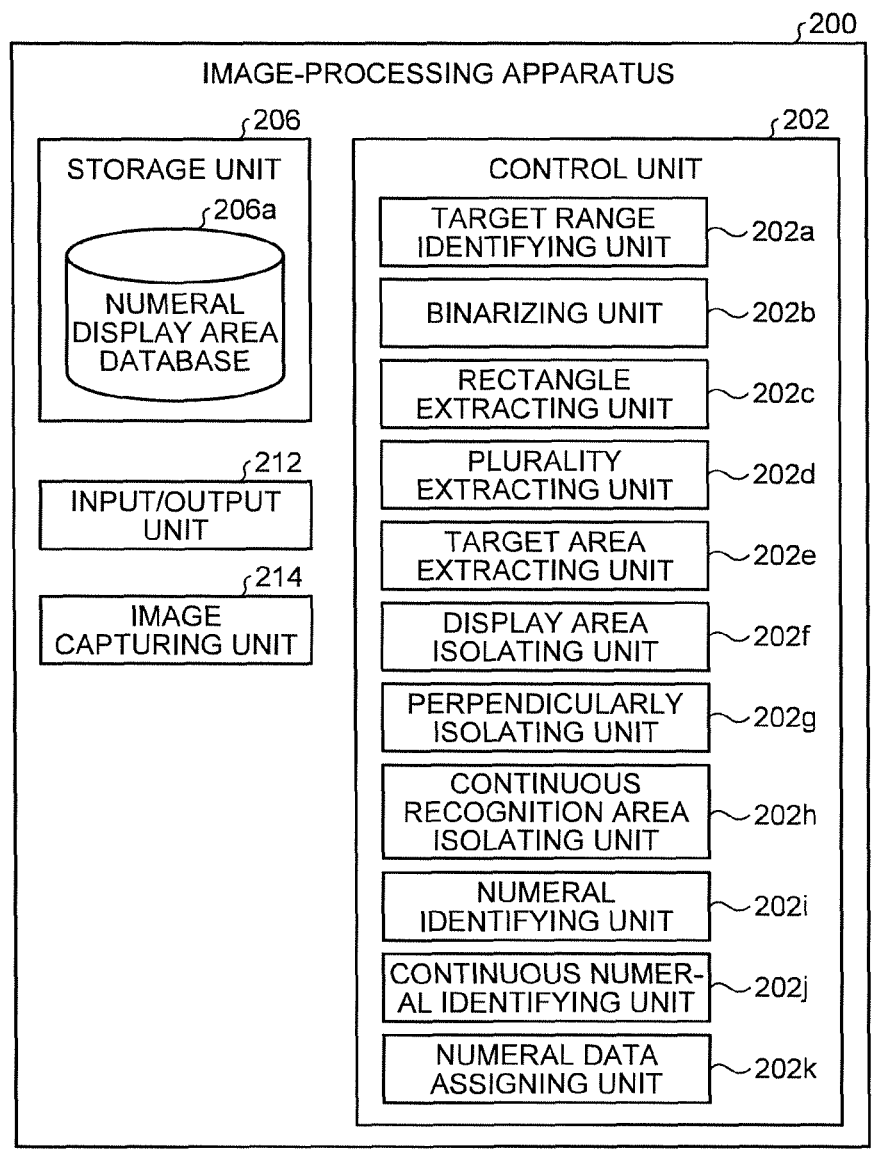
FIG. 2 is a block diagram of an exemplary configuration of the image-processing apparatus according to the embodiment.

As shown in FIG. 2, the image-processing apparatus 200 is configured as a stand-alone type, generally including the control unit 202, the storage unit 206, the input/output unit 212, and an image capturing unit 214. The image-processing apparatus 200 may further include the communication unit 204 (not shown).

These components of the image-processing apparatus 200 are connected via any communication path so as to be capable of communicating with each other. The control unit 202 may control the communication unit 204, the input/output unit 212, and the image capturing unit 214. The control unit 202, the communication unit 204, the storage unit 206, and the input/output unit 212 in the image-processing apparatus 200 has basic functions identical to those in the first configuration and explanations therefor will be omitted.

The image capturing unit 214 may be a planar array of image capturing elements, such as CCD image sensors or CMOS image sensors. The image capturing unit 214 may be configured so as to simultaneously capture images of objects within the image capturing range using the image capturing elements arrayed planarly.

The control unit 202 can control the image capturing unit 214 and may perform control relating to image capturing, including adjustments of image capturing timing, exposure time, and focusing at the image capturing unit 214.

The control unit 202 may process images captured by the image capturing unit 214. Specifically, when the image capturing unit 214 captures an image, each of the image capturing elements of the image capturing unit 214 outputs, for each exposure, an image signal on the basis of an output value corresponding to light incident thereupon to the control unit 202. The control unit 202 may then perform image processing, including generation of one piece of image data on the basis of this image signal.

Processing in Embodiment

The following explains, with reference to FIGS. 3 to 34, exemplary processing performed by the image-processing apparatus 200 configured as described above.

Numeral Display Area Identifying Process

Figure 3:
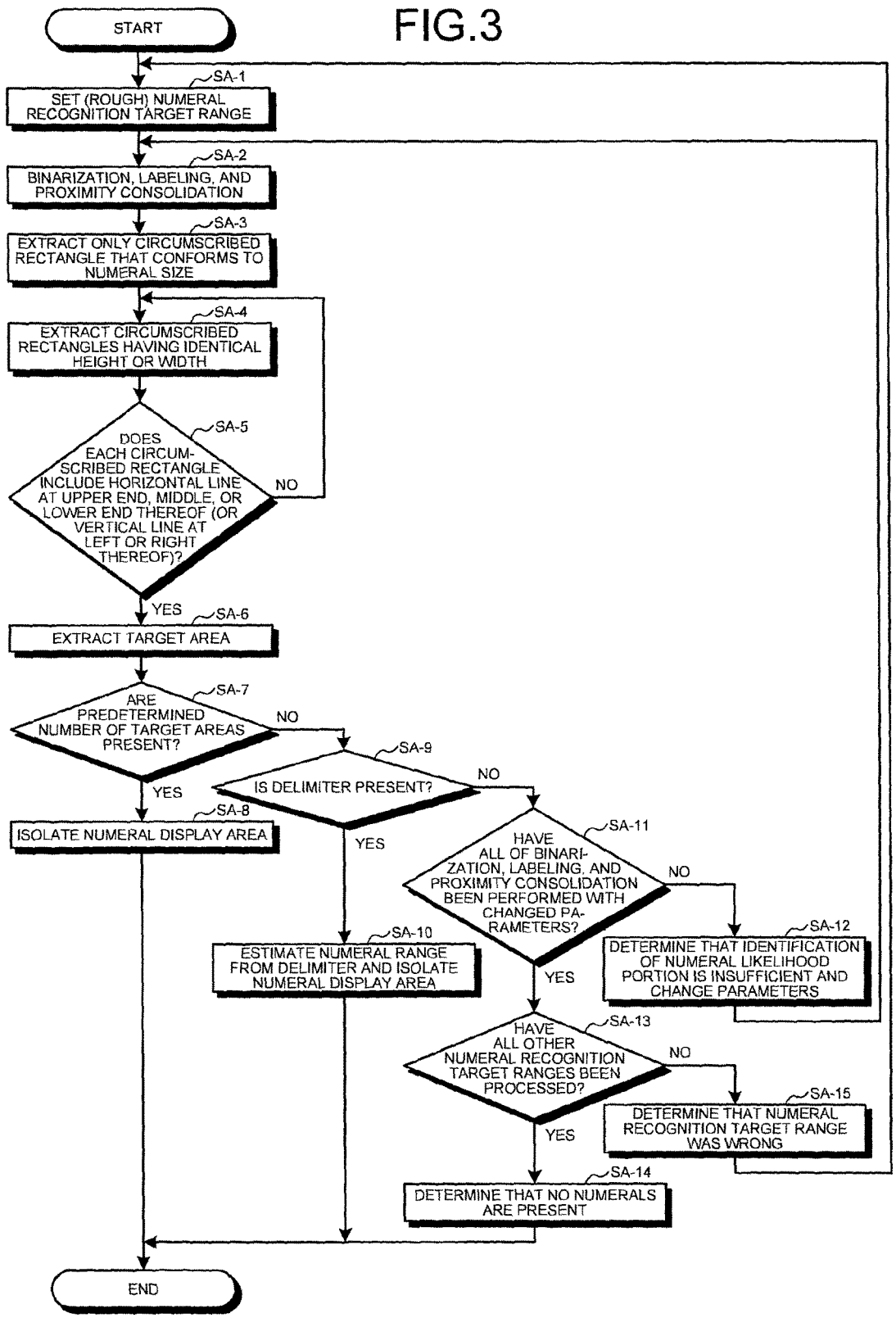
FIG. 3 is a flowchart of exemplary processing performed by the image-processing apparatus according to the embodiment.

The following explains, with reference to FIGS. 3 to 33, an exemplary numeral display area identifying process in the image-processing apparatus 200 according to the embodiment. FIG. 3 is a flowchart of the exemplary process performed by the image-processing apparatus 200 according to the embodiment.

As shown in FIG. 3, the target range identifying unit 202a identifies (sets) a (rough) numeral recognition target range in the image based on the image data acquired from the storage unit 206 (step SA-1).

In this case, the target range identifying unit 202a may search for a rectangular range included in the image to thereby identify the rectangular range as the numeral recognition target range. Examples of the rectangular range may include, not only a range of a quadrilateral having angles of four corners identical to each other (a square or a rectangle), but also a range of a quadrilateral having angles of four corners different from each other (a rhombus, a trapezoid, or a parallelogram) or a range of a shape having opposite sides extending in parallel with each other, but having rounded corners.

Alternatively, the target range identifying unit 202a may identify, as the numeral recognition target range, a specified range specified by the user via the input/output unit 212 or a predetermined set range (fixed value). The target range identifying unit 202a may identify the numeral recognition target range by using the searched rectangular range in combination with the specified range and the set range.

Still alternatively, the target range identifying unit 202a may identify the entire image as the numeral recognition target range, if the image contains no rectangular ranges.

Figure 4:
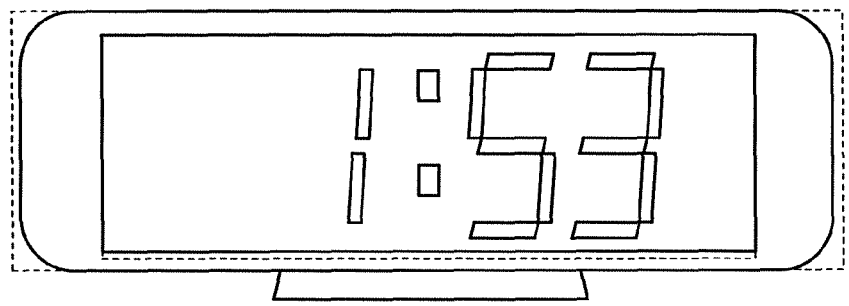
FIG. 4 is an illustration of exemplary identification of a numeral recognition target range in the embodiment.

The following explains, with reference to FIG. 4, exemplary identification of the numeral recognition target range in the embodiment. FIG. 4 is a diagram of the exemplary identification of the numeral recognition target range in the embodiment.

When a numeral as the recognition target is on a signboard, an electric scoreboard, a digital clock, an electronic calculator, or a handwritten mark sheet, a rectangular (including rounded corners) outer frame, such as a liquid crystal frame or a product outline, is highly likely to be present. Thus, as shown in FIG. 4, the target range identifying unit 202a may search the image of the digital clock for a rectangle (the liquid crystal frame and the digital clock product outline) to thereby identify the range of the rectangle (indicated by the dotted line in FIG. 4) as the rough numeral recognition target range.

Returning to FIG. 3, the binarizing unit 202b binarizes the numeral recognition target range data of the numeral recognition target range using the threshold based on luminance and hue, to thereby acquire the binarizing range data. The rectangle extracting unit 202c then subjects the binarizing range data to labeling (labeling and proximity consolidation) to thereby extract, in the binarizing range based on the binarizing range data, the numeral likelihood portion that is likely to represent a numeral (step SA-2).

Figure 5:
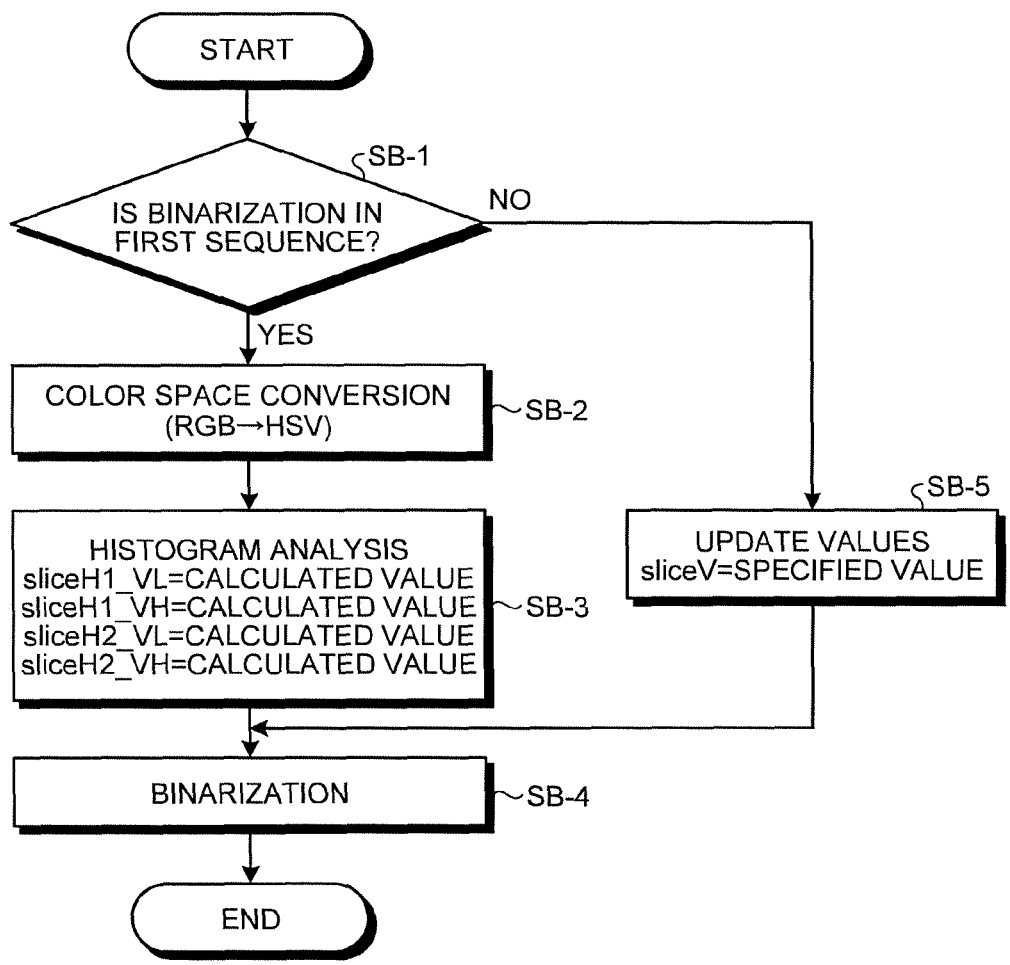
FIG. 5 is a flowchart of exemplary processing performed by the image-processing apparatus in the embodiment.
Figure 6:
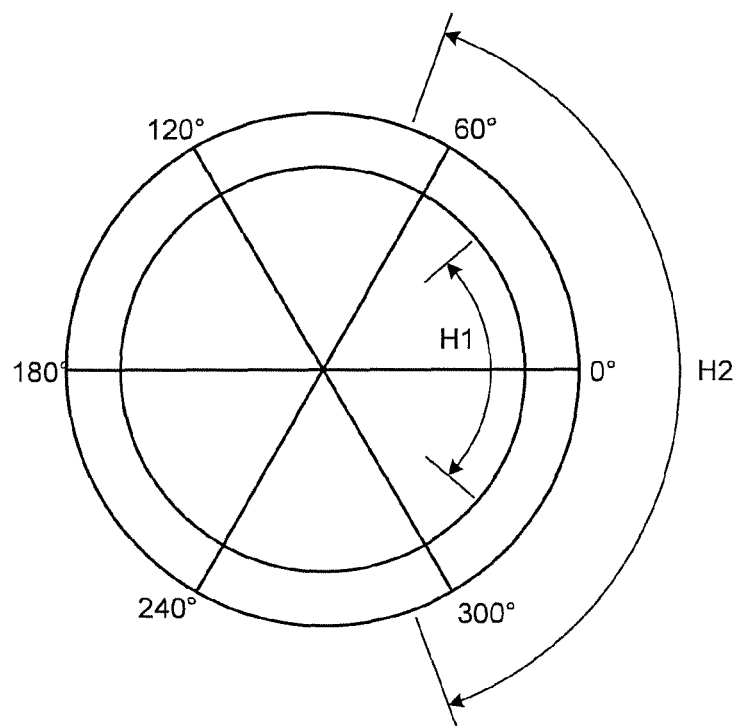
FIG. 6 is an illustration for illustrating histogram extraction of hue in the embodiment.

An exemplary binarization processing in the embodiment will be explained below with reference to FIGS. 5 and 6. FIG. 5 is a flowchart of the exemplary binarization processing in the image-processing apparatus 200 in the embodiment. FIG. 6 is an illustration for illustrating histogram extraction of hue in the embodiment.

As shown in FIG. 5, in a subroutine that performs the binarization processing, the binarizing unit 202b determines whether the current binarization processing is in a first sequence (step SB-1). Specifically, because the binarization processing for the numeral recognition target range is performed through feedback, the process at this stage determines whether the current binarization processing is in the first sequence before the feedback.

If the binarizing unit 202b determined that the current binarization processing is in the first sequence (Yes at step SB-1), the processing is shifted to step SB-2.

The binarizing unit 202b then performs color space conversion (step SB-2).

Specifically, the binarizing unit 202b may convert the numeral recognition target range data digitized as an RGB color model represented by the three primary colors of red (R), green (G), and blue (B) to corresponding data represented in an HSV color space composed of the three components of hue, saturation, and value (or luminance).

The binarizing unit 202b converts the numeral recognition target range data to the corresponding data in the HSV color space and performs a histogram analysis (step SB-3). The histogram analysis may be performed on the hue and the value of the numeral recognition target range data converted to the data in the HSV color space. The histogram analysis performed on the hue will be explained first. To perform the histogram analysis of the hue, the binarizing unit 202b may extract the histogram of the hue.

As shown in FIG. 6, the hue can represent different colors over a range of 0 to 360 degrees. For the histogram extraction of the hue performed by the binarizing unit 202b, a desired color in the hue is set as 0 degree and colors falling within a desired range centering about 0 degree are extracted.

Specifically, a date assigned to a photo is typically in an orange-based color. Of the colors indicated by 0 to 360 degrees, an orange-based color that is most likely to be the color of the date is defined as 0 degree and colors falling within a predetermined range centering about 0 degree are extracted.

For example, condition H1 and condition H2 are set as conditions on the hue. The condition H1 is ±40 degrees, and the condition H2 is ±80 degrees. Of pixels that constitute the numeral recognition target range data, pixels in colors satisfying the condition H1 and pixels in colors satisfying the condition H2 are extracted. The histogram extraction of the hue is thereby performed.

The extracted hue histogram is then subjected to logarithmization and data weighting to thereby make data easier to handle. Binarization slice values are next calculated using a value histogram. Specifically, the value histogram is used to calculate thresholds for determining whether to set 1 or 0 for each pixel during the binarization.

For example, condition V1 and condition V2 are set as conditions for the value. For the condition V1, an 80% value in the value histogram of the entire numeral recognition target range data is calculated as the threshold and, for the condition V2, a 40% value in the value histogram of the entire numeral recognition target range data is calculated as the threshold. A histogram analysis is then performed using the value thresholds thus calculated and the hue conditions to determine whether each of pixels constituting the numeral recognition target range data satisfies the two conditions.

Specifically, to perform the histogram analysis, the following thresholds are first calculated: sliceH1_VL as a threshold using the hue condition H1 and the value condition V1, sliceH1_VH as a threshold using the hue condition H1 and the value condition V2, sliceH2_VL as a threshold using the hue condition H2 and the value condition V1, and sliceH2_VH as a threshold using the hue condition H2 and the value condition V2.

A determination is then made as to whether the hue and the value of each of the pixels constituting the numeral recognition target range data satisfy each of the calculated thresholds. The binarizing unit 202b thus performs the histogram analysis of the numeral recognition target range data.

Returning to FIG. 5, the binarizing unit 202b performs the histogram analysis and the binarization of the numeral recognition target range data (step SB-4), and terminates the process. Specifically, the binarizing unit 202b may binarize the numeral recognition target range data by setting 1 when each of the pixels constituting the numeral recognition target range data satisfies the calculated threshold, and by setting 0 when each of the pixels constituting the numeral recognition target range data does not satisfy the calculated threshold.

The numeral recognition target range data to be binarized may be converted to, for example, data composed of black and white only through conversion of pixels having a value of 1 to black and conversion of pixels having a value of 0 to white. Alternatively, the binarizing unit 202b may binarize the numeral recognition target range data using the thresholds based on the value and the hue as explained above.

If the binarizing unit 202b determined that the current binarization processing is not in the first sequence (No at step SB-1), the processing is shifted to step SB-5.

The binarizing unit 202b then updates values used for the histogram analysis (step SB-5), and shifts the processing to step SB-4.

If the numeral cannot be identified during identification of the numeral, the condition of the histogram may be fed back to the subroutine of the binarization processing to thereby update the values used for the histogram analysis. Specifically, a sliceV used as a threshold for the value may be determined a specified value.

Figure 7:
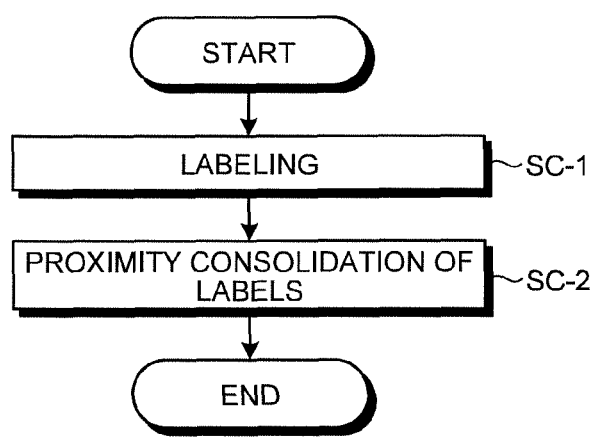
FIG. 7 is a flowchart of exemplary processing performed by the image-processing apparatus according to the embodiment.

The following explains, with reference to FIGS. 7 to 14, an exemplary labeling processing in the embodiment. FIG. 7 is a flowchart of exemplary processing performed by the image-processing apparatus 200 according to the embodiment.

As shown in FIG. 7, in a subroutine for performing the identification step, the rectangle extracting unit 202c first subjects the binarized numeral recognition target range data to labeling (step SC-1).

Figures 8, 9:
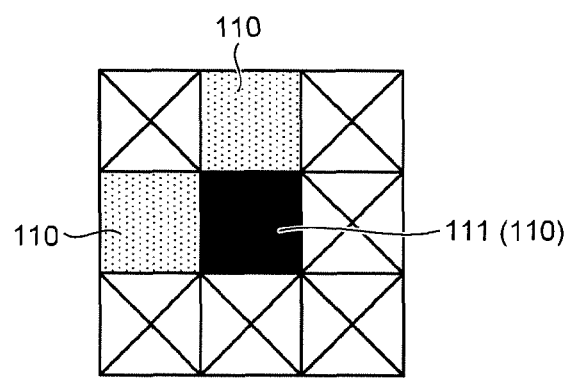
FIG. 8 is an illustration for illustrating labeling performed for binarized numeral recognition target range data.
FIG. 9 is an illustration for illustrating a method for checking other pixels during assignment of a label number to one pixel.
Figure 10:
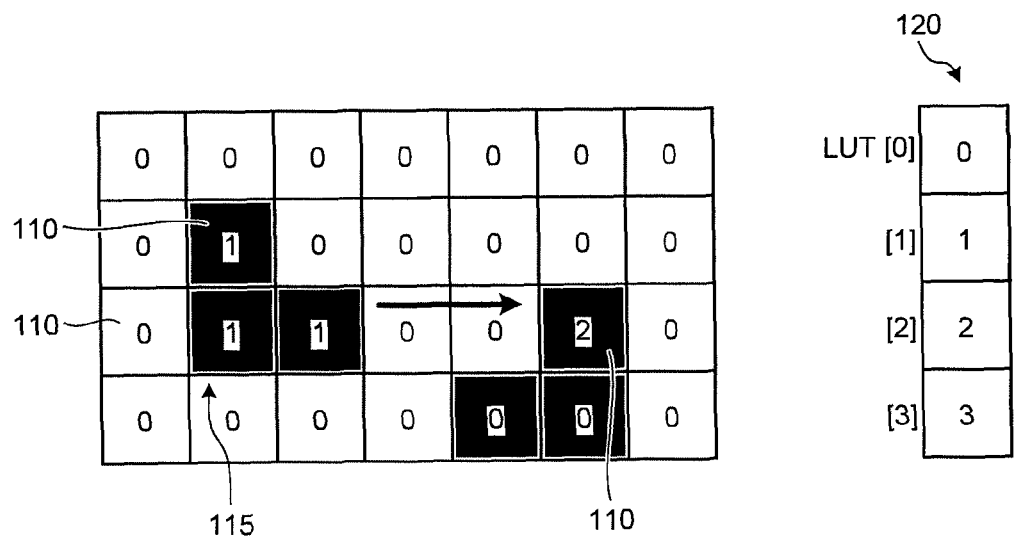
FIG. 10 is an illustration for illustrating a procedure for assigning label numbers.
Figure 11:
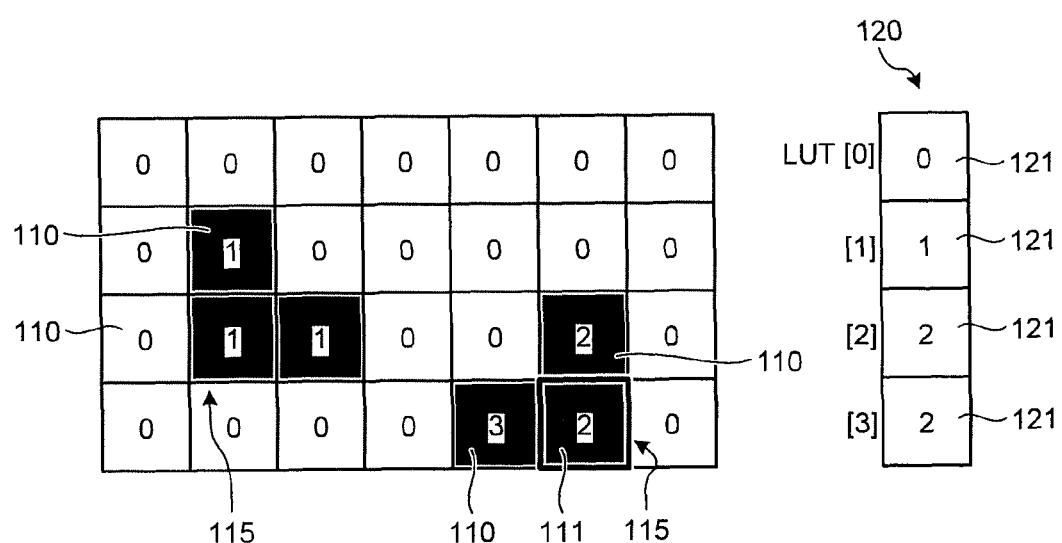
FIG. 11 is an illustration for illustrating rewriting of values in a lookup table (LUT)
Figure 12:
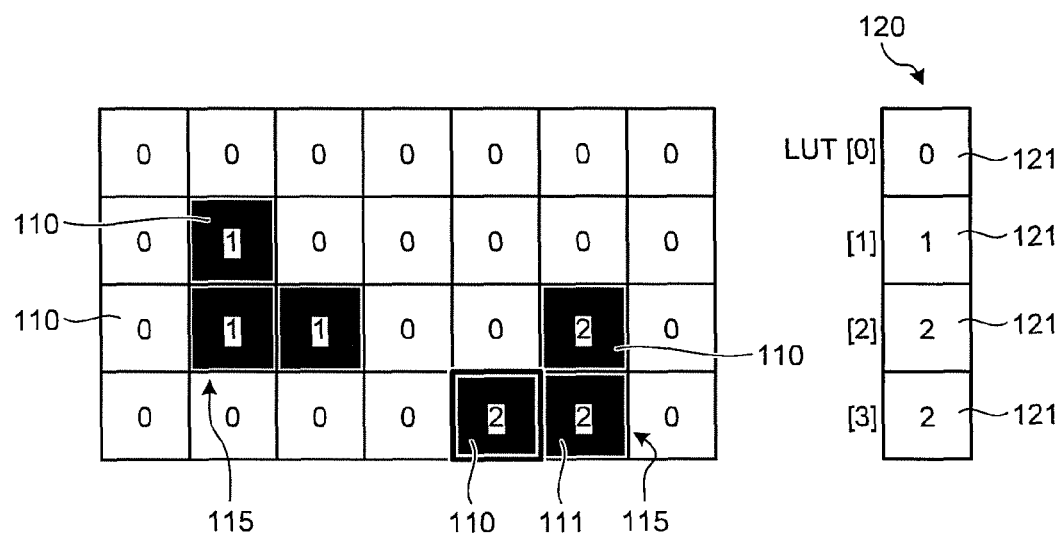
FIG. 12 is an illustration for illustrating how the label numbers are reorganized on the basis of the values in the LUT.

The following explains, with reference to FIGS. 8 to 12, exemplary labeling in the embodiment. FIG. 8 is an illustration for illustrating the labeling performed for the binarized numeral recognition target range data. FIG. 9 is an illustration for illustrating a method for checking other pixels during assignment of a label number to one pixel. FIG. 10 is an illustration for illustrating a procedure for assigning label numbers. FIG. 11 is an illustration for illustrating rewriting of values in a lookup table (LUT). FIG. 12 is an illustration for illustrating how the label numbers are reorganized on the basis of the values in the LUT.

As shown in FIG. 8, during the labeling performed by the rectangle extracting unit 202c, raster scanning is performed of a plurality of pixels 110 that are arrayed in height and width directions to thereby constitute the numeral recognition target range data.

Specifically, for example, the rectangle extracting unit 202c scans the numeral recognition target range data including the black and white pixels 110 generated by the binarization, rightward from the pixel 110 on the upper left corner. Having reached at the pixel on the right end, the rectangle extracting unit 202c scans the numeral recognition target range data again starting at the pixel 110 on the left end in one line below toward the right end.

The rectangle extracting unit 202c repeats these steps to complete scanning for the labeling until all pixels 110 constituting the numeral recognition target range data are scanned. In the labeling, these scanning sequences are performed to search for black pixels 110. When a plurality of black pixels 110 are grouped together, one label number is assigned to these pixels 110.

As shown in FIG. 9, having detected a black pixel 110 through the raster scanning performed for the numeral recognition target range data, the rectangle extracting unit 202c defines the detected pixel as an interest pixel 111 and checks to determine whether label numbers are assigned to the pixel 110 to the left of the interest pixel 111 and the pixel 110 immediately above the interest pixel 111.

As shown in FIG. 10, if a label number is assigned to the pixel 110 to the left or above the interest pixel 111, the rectangle extracting unit 202c assigns the smallest label number of the detected label numbers to the interest pixel 111. Specifically, if the label number assigned to the pixel 110 left to the interest pixel 111 differs from the label number assigned to the pixel 110 above the interest pixel 111, the rectangle extracting unit 202c assigns the smaller label number of these label numbers to the interest pixel 111.

If no label numbers are assigned to both the pixels 110 to the left and above the interest pixel 111, the rectangle extracting unit 202c assigns a new label number to the interest pixel 111 (see the pixel 110 having the label number "2" assigned thereto in FIG. 10). Specifically, the rectangle extracting unit 202c assigns the value of the label number assigned last+1 to the interest pixel 111.

When the pixels 110 have been labeled in the above-described manner, the rectangle extracting unit 202c regards the pixels 110 to each of which an identical label number is assigned as one label.

As shown in FIG. 11, when the label number assigned to the pixel 110 left to the interest pixel 111 differs from the label number assigned to the pixel 110 above the interest pixel 111 and when the smaller label number is assigned to the interest pixel 111, the rectangle extracting unit 202c rewrites an LUT 120 that describes data used for reorganizing the label numbers.

For example, when the label number assigned to the pixel 110 to the left of the interest pixel 111 is "3" and the label number assigned to the pixel 110 above the interest pixel 111 is "2", the rectangle extracting unit 202c assigns the smaller label number "2" to the interest pixel 111. In this case, of storages 121, each made available for each label number, in the LUT 120, the rectangle extracting unit 202c rewrites the value of the storage 121 that stores data corresponding to the label number "3" to "2".

Then, as shown in FIG. 12, when having rewritten the value of the storage 121 corresponding to the label number "3" in the LUT 120 to "2", the rectangle extracting unit 202c rewrites the label number, out of the label numbers assigned to the pixels 110 of the numeral recognition target range data, of the pixel 110 to which the label number "3" is assigned in accordance with the LUT 120.

Specifically, because "2" is set in the storage 121 in the LUT 120 which has had the label number "3", the rectangle extracting unit 202c rewrites the label number of the pixel 110 among the pixels 110 of the numeral recognition target range data to which the label number "3" is assigned to "2".

For example, when the label number of the pixel 110 to the left of the interest pixel 111 in FIG. 11 is "3", the value of the storage 121 corresponding to the label number "3" in the LUT 120 is rewritten to "2", so that the label number of the pixel 110 to the left of the interest pixel 111 is also rewritten to "2".

The LUT 120 is used, when the label numbers differ between the pixel 110 to the left of the interest pixel 111 and the pixel 110 above the interest pixel 111, to assign the same label number to the label-number-assigned pixels 110 adjacent to each other in order to treat the adjacent pixels as an identical label as described above.

The rectangle extracting unit 202c performs the labeling of the numeral recognition target range data by assigning label numbers to the binarized numeral recognition target range data through raster scanning and reorganizing the label numbers using the LUT 120 as necessary.

Returning to FIG. 7, when having subjected the numeral recognition target range data to the labeling, the rectangle extracting unit 202c next performs proximity consolidation of the labels (step SC-2), and terminates the processing. Specifically, the rectangle extracting unit 202c consolidates labels spaced apart from each other with a relatively short distance therebetween with each other so as to treat these labels as one label.

Figure 13:
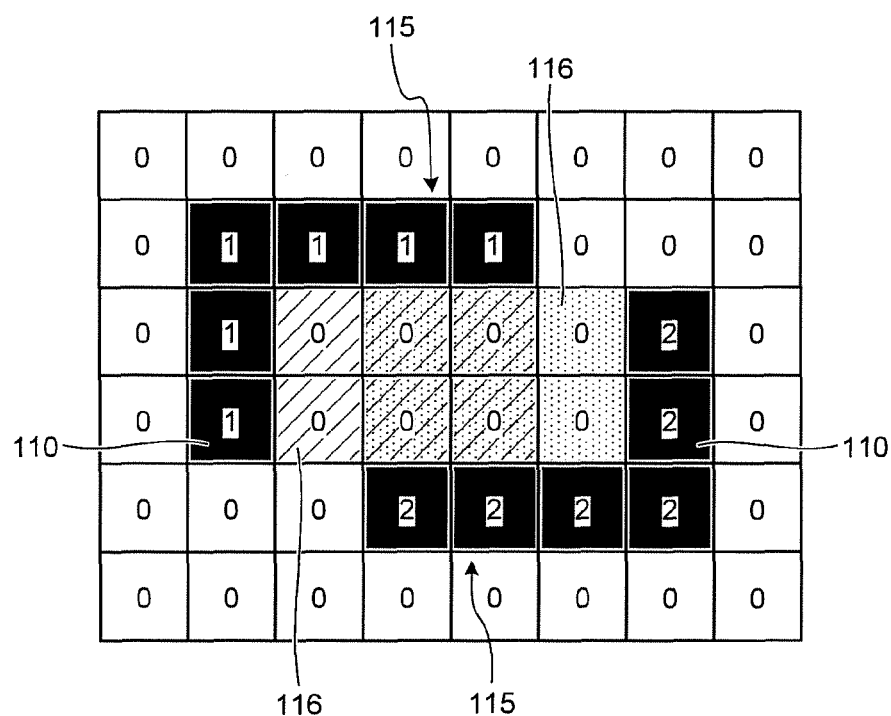
FIG. 13 is an illustration for illustrating a state in which label areas overlap in part.
Figures 14, 15:
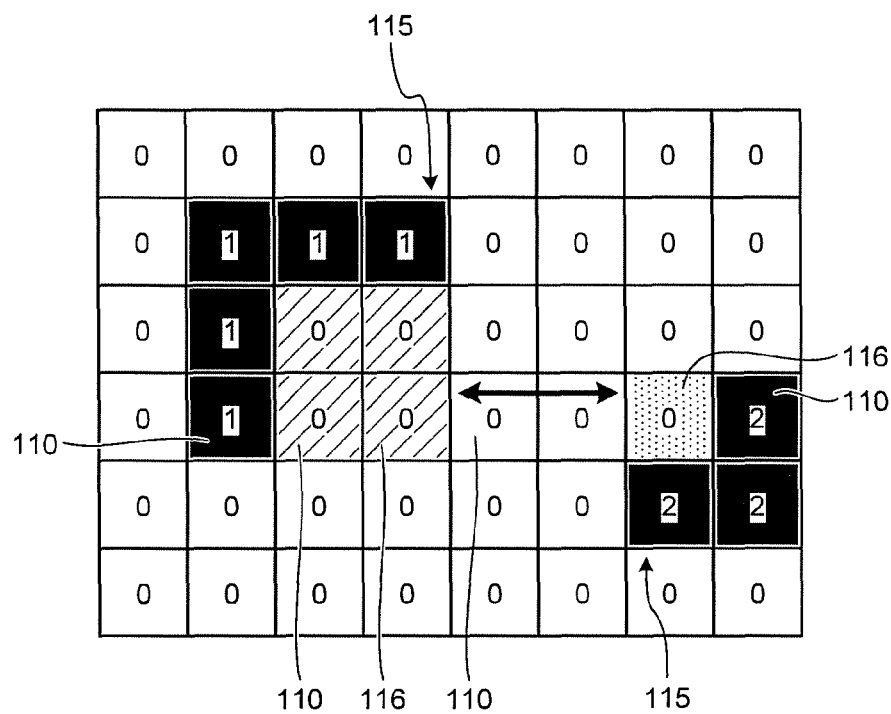
FIG. 14 is an illustration for illustrating a distance between labels.
FIG. 15 is a figure of an exemplary reference size in the embodiment.

The following explains, with reference to FIGS. 13 and 14, exemplary proximity consolidation in the embodiment. FIG. 13 is an illustration for illustrating a state in which label areas overlap in part. FIG. 14 is an illustration for illustrating a distance between labels.

As shown in FIG. 13, when label areas 116 of the respective labels 115 that are spaced apart from each other overlap each other or a distance between the labels 115 spaced apart from each other falls within a predetermined range, the rectangle extracting unit 202c consolidates these labels 115 with each other (proximity consolidation) to thereby treat these labels 115 as one label 115.

As shown in FIG. 13, for example, the label area 116 of each label 115 is defined to be an area extending from a vertical end of a single label 115 extending in the height direction and the width direction, to a pixel 110 at a lateral end having the same height as that of the pixel 110 at the vertical end. The two labels 115 having the respective label areas 116 defined as described above overlapping each other are subjected to the proximity consolidation to thereby be treated as one label 115.

Additionally, as shown in FIG. 14, two labels 115 are subjected to the proximity consolidation when the distance therebetween falls within a preset threshold when the label areas 116 do not overlap each other. For example, assume that the threshold is set to be five pixels. When the distance between the two labels 115 is five pixels or less, the two labels 115 are subjected to the proximity consolidation so as to be treated as one label 115.

When the distance between two different labels 115 in the numeral recognition target range data falls within a predetermined value, the rectangle extracting unit 202c extracts target area data by regarding the different labels 115 as a single piece of the target area data.

Returning to FIG. 3, if the circumscribed rectangle of the numeral likelihood portion conforms to a numeral size (reference size), the rectangle extracting unit 202c extracts the circumscribed rectangle (step SA-3).

The following explains, with reference to FIG. 15, exemplary criteria in the embodiment. FIG. 15 is a figure of the exemplary reference size in the embodiment.

As shown in FIG. 15, when determining whether the label 115 conforms to the numeral size (whether the label 115 is noise), the rectangle extracting unit 202c establishes reference sizes and reference width-to-height ratio of the label 115 and removes, as noise, any objects not falling within the established criteria.

In the exemplary criteria shown in FIG. 15, the reference size of the label 115 that is likely to represent any object other than the numeral "1" is 40×60 in terms of the number of pixels 110 in the width direction and in the height direction, and the reference size of the label 115 that is likely to represent the numeral "1" is 10×30 to 60 in terms of the number of pixels 110 in the width direction and in the height direction.

The label 115 that is likely to represent any object other than the numeral "1" has a width (x) to height (y) ratio of 2:3 and the label 115 that is likely to represent the numeral "1" has a width (x) to height (y) ratio of 1:3 to 1:6. The rectangle extracting unit 202c determines whether the size of each of the labels 115 satisfies these criteria and removes, as noise, any label 115 that does not satisfy the criteria.

When a large number of indistinct images are involved, the rectangle extracting unit 202c may be given an enlarged allowable deviation from the criteria when determining whether a label 115 is noise, so that the rectangle extracting unit 202c can retain as many labels 115 as possible that are likely to represent numerals, thereby preventing labels 115 representing numerals from removing more than necessary.

Returning to FIG. 3, when a plurality of circumscribed rectangles having an identical height or width are arrayed, the plurality extracting unit 202d extracts the circumscribed rectangles having the identical height or width (step SA-4). Alternatively, when the circumscribed rectangles having the identical height or width are arrayed, the plurality extracting unit 202*d* may extract circumscribed rectangles that constitute a circumscribed rectangle group.

When a plurality of numerals are to be recognized, the numerals to be recognized are each likely to have one or both of a regular height and a regular width. Thus, the plurality extracting unit 202*d* may extract, as candidates for the numerals, circumscribed rectangles having the same height or width as a result of the proximity consolidation.

Figure 16:
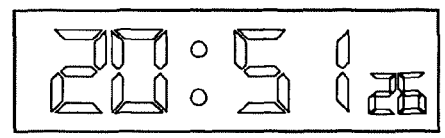
FIG. 16 is an illustration of an exemplary image of a digital clock in the embodiment.
Figure 17:
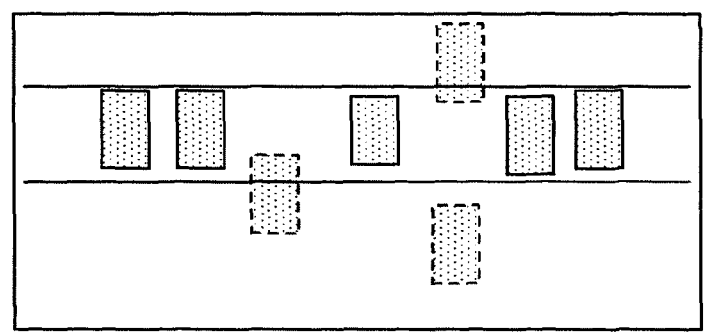
FIG. 17 is an illustration for illustrating extraction of the circumscribed rectangles on the basis of a height.
Figure 18:
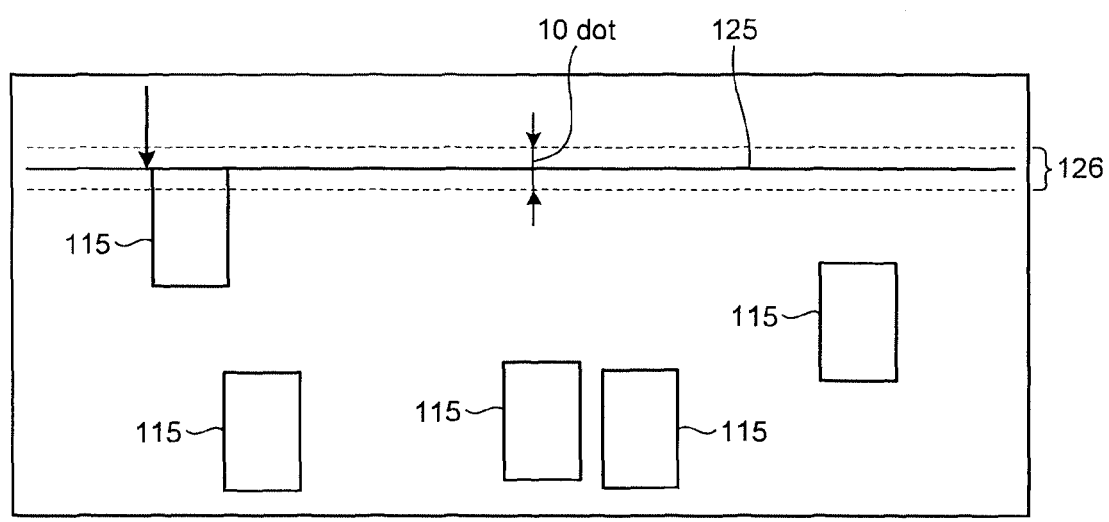
FIG. 18 is an illustration for illustrating extraction of the circumscribed rectangles on the basis of a height.

The following explains, with reference to FIGS. 16 to 18, exemplary extraction of circumscribed rectangles on the basis of the height in the embodiment. FIG. 16 is an illustration of an exemplary image of a digital clock in the embodiment. FIGS. 17 and 18 are illustrations for illustrating extraction of the circumscribed rectangles on the basis of the height.

As shown in FIG. 17, to extract a numeral on the basis of the height from an image (for example, an image of a digital clock in which hours and minutes are placed in the width direction as shown in FIG. 16), the plurality extracting unit 202*d* extracts a plurality of circumscribed rectangles having heights that fall within a predetermined height range (between the lines in FIG. 17) and placed in the width direction.

To determine whether a circumscribed rectangle (label 115) is noise, the plurality extracting unit 202*d* may set a detection line 125 to thereby make a determination on the basis of the detection line 125 as shown in FIG. 18.

The determination of whether noise is present is made using the detection line 125 as follows. Specifically, the detection line 125 extending in the width direction is set in sequence starting with the uppermost label 115 out of a plurality of labels 115 disposed within the numeral recognition target range data and it is determined whether a label 115 is present within a predetermined range from the detection line 125.

As shown in FIG. 18, for example, the plurality extracting unit 202*d* sets the detection line 125 extending in the width direction at the upper end position of the uppermost label 115 out of the labels 115 disposed within the numeral recognition target range data.

The plurality extracting unit 202*d* next sets, as a detection range 126, a predetermined range in the height direction with respect to the detection line 125 (specifically, for example, a range of five each pixels on both sides in the height direction from the detection line 125). Specifically, the plurality extracting unit 202*d* sets the detection range 126 as a range that extends in the width direction with ten pixels on both sides in the height direction.

The plurality extracting unit 202*d* then detects labels 115 that overlap the detection range 126. When two or more labels 115 overlapping the detection range 126 are detected, the plurality extracting unit 202*d* sets an upper end line to be at the position in the height direction of the highest pixel 110 of all the labels 115 that overlaps the detection range 126.

Similarly, the plurality extracting unit 202*d* sets a lower end line to be the position in the height direction of the lowest pixel 110 of all the labels 115 overlapping the detection range 126. The plurality extracting unit 202*d* then removes, as noise, all labels 115 but the labels 115 disposed between the upper end line and the lower end line.

Specifically, the plurality extracting unit 202*d* sets the upper end line and the lower end line as shown in FIG. 18 to thereby regard the area between the upper end line and the lower end line in the numeral recognition target range data as the numeral display area, thereby removing the labels 115 disposed outside the numeral display area.

When the detection range 126 has been set and the detection of the labels 115 overlapping the detection range 126 has been conducted but two or more labels 115 are not detected to overlap the detection range 126, the plurality extracting unit 202*d* sets a new detection line 125 on the basis of a different label 115 that is disposed at the next highest position out of the labels 115 disposed within the numeral recognition target range data and repeats the same detection procedure.

The plurality extracting unit 202*d*, if it is unable to set the upper end line and the lower end line through the foregoing repeated procedures, determines that the detection of the numeral display area has failed and removes all labels 115.

Figure 19:
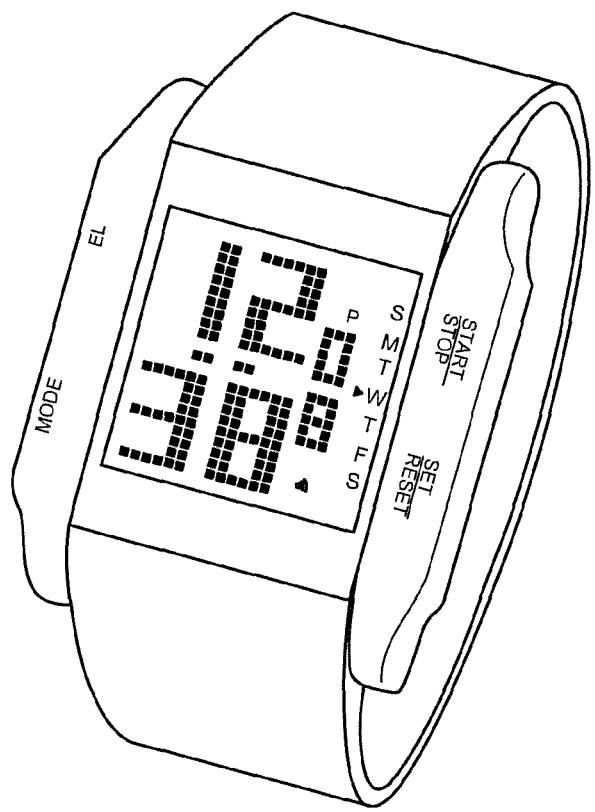
FIG. 19 is an illustration of an exemplary image of a digital clock in the embodiment.
Figure 20:
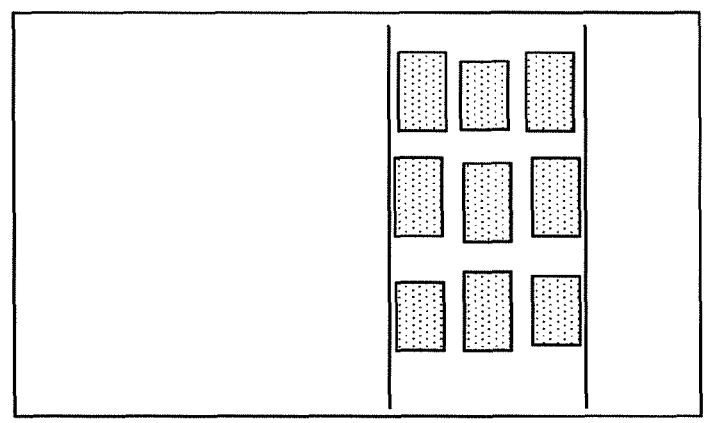
FIG. 20 is an illustration for illustrating extraction of the circumscribed rectangles on the basis of a width.
Figure 21:
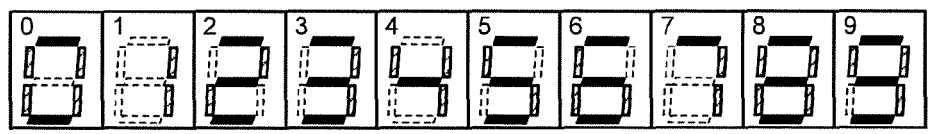
FIG. 21 is an illustration for illustrating exemplary segment recognition in the embodiment.

The following explains, with reference to FIGS. 19 and 20, exemplary extraction of circumscribed rectangles on the basis of the width in the embodiment. FIG. 19 is an illustration of an exemplary image of a digital clock in the embodiment. FIG. 20 is an illustration for illustrating extraction of the circumscribed rectangles on the basis of the width.

As shown in FIG. 20, to extract a numeral on the basis of the width from an image (for example, an image of a digital clock in which hours and minutes are placed in the height direction as shown in FIG. 19), the plurality extracting unit 202*d* extracts a plurality of circumscribed rectangles having widths that fall within a predetermined width range (between the lines in FIG. 20) and placed in the height direction.

Even when a plurality of numerals are placed in the height direction or even with a vertically arranged electric scoreboard as described above, the plurality extracting unit 202*d* can extract the circumscribed rectangles of the numerals on the basis of the width.

Returning to FIG. 3, the target area extracting unit 202*e* determines whether the circumscribed rectangles extracted by the plurality extracting unit 202*d* each include a horizontal line that constitutes an upper-end, middle, or lower-end segment of a multiple-segment character (or a vertical line that constitutes a left-end or a right-end segment of the multiple-segment character) (step SA-5).

If the target area extracting unit 202*e* determined that the circumscribed rectangle does not include the horizontal line (or the vertical line) that constitutes a segment of the multiple-segment character (No at step SA-5), the processing is shifted to step SA-4.

If the target area extracting unit 202*e* determined that the circumscribed rectangle includes the horizontal line (or the vertical line) that constitutes a segment of the multiple-segment character (Yes at step SA-5), the processing is shifted to step SA-6.

The target area extracting unit 202*e* then extracts, as the target area for numeral identification, the circumscribed rectangle that includes the horizontal line (or the vertical line) (step SA-6). When, for example, the number of numerals to be recognized is unknown, the target area extracting unit 202*e* may regard an area that includes a group of extracted target areas as the numeral display area to then shift the processing to step SA-8.

If the circumscribed rectangles extracted by the plurality extracting unit 202*d* each include the horizontal line that constitutes the upper-end, middle, or lower-end segment of the multiple-segment character, the target area extracting unit 202*e* may extract the circumscribed rectangle that includes the horizontal line as the target area for numeral identification for numerals 0 and 2 to 9.

The following explains, with reference to FIGS. 21 to 24, exemplary segment recognition in the embodiment. FIGS. 21 to 24 are illustrations for illustrating exemplary segment recognition in the embodiment.

A multiple-segment character including seven or more segments invariably includes a horizontal bar to represent any numeral other than the numeral "1". Thus, in the seven-segment characters shown in FIG. 21, when any of a top, middle, and bottom of the circumscribed rectangle includes a horizontal bar, the target area extracting unit 202e determines the circumscribed rectangle as a numeral.

Figure 22:
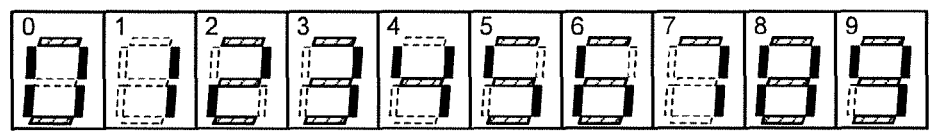
FIG. 22 is an illustration for illustrating exemplary segment recognition in the embodiment.

Additionally, in the seven-segment characters shown in FIG. 22, when any of left and right of the circumscribed rectangle includes a vertical bar, the target area extracting unit 202e determines the circumscribed rectangle as a numeral. In this case, the target area extracting unit 202e may determine the circumscribed rectangle as a numeral on the basis that a vertical bar is present at either left or right of the circumscribed rectangle in any numeral other than "2" and "5". In the numerals of "2" and "5", the target area extracting unit 202e may determine the circumscribed rectangle as a target area on the basis that either an upper half or lower half vertical bar is present on the right or left.

Figure 23:
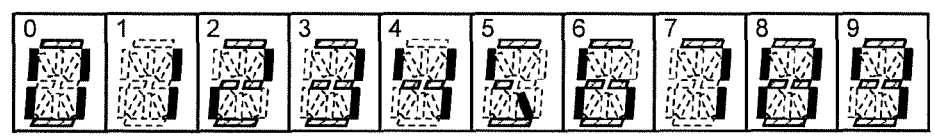
FIG. 23 is an illustration for illustrating exemplary segment recognition in the embodiment.
Figure 24:
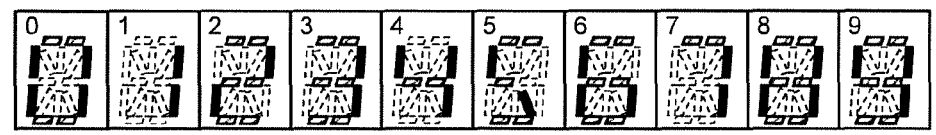
FIG. 24 is an illustration for illustrating exemplary segment recognition in the embodiment.

With a 14-segment character, a 16-segment character, and the like, only the numeral "5" has a segment pattern different from that of the seven-segment character. As shown in FIGS. 23 and 24, therefore, to recognize on the basis of vertical lines in multiple segments, the target area extracting unit 202e may determine the target area on the basis of presence of a left vertical line or a left vertical line and a lower right oblique line.

Additionally, when a circumscribed rectangle satisfies the reference size established for the numeral "1", the target area extracting unit 202e may extract the circumscribed rectangle as the target area for numeral identification for the numeral "1".

Figure 25:
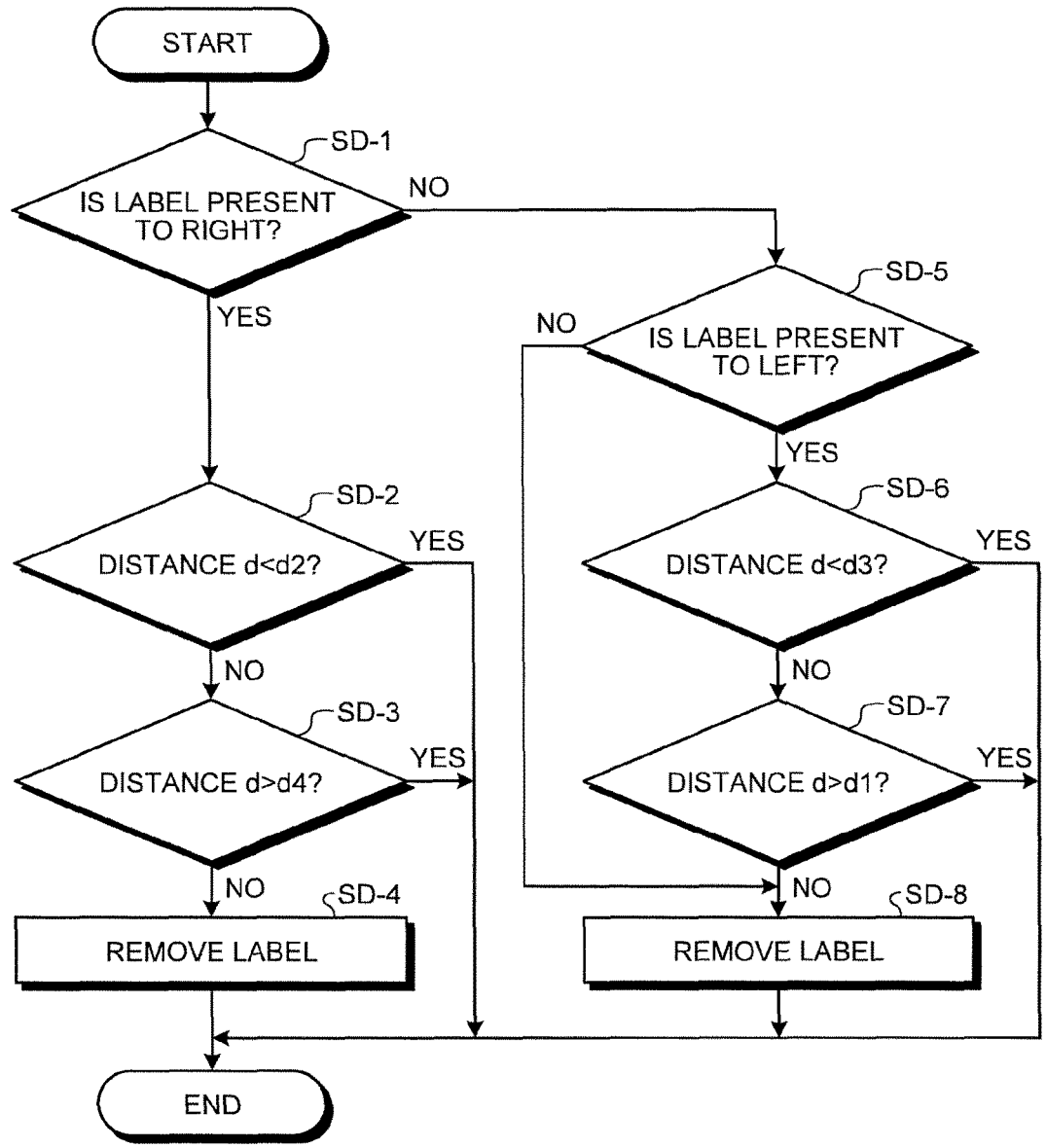
FIG. 25 is a flowchart of exemplary processing performed by the image-processing apparatus according to the embodiment.
Figure 26:
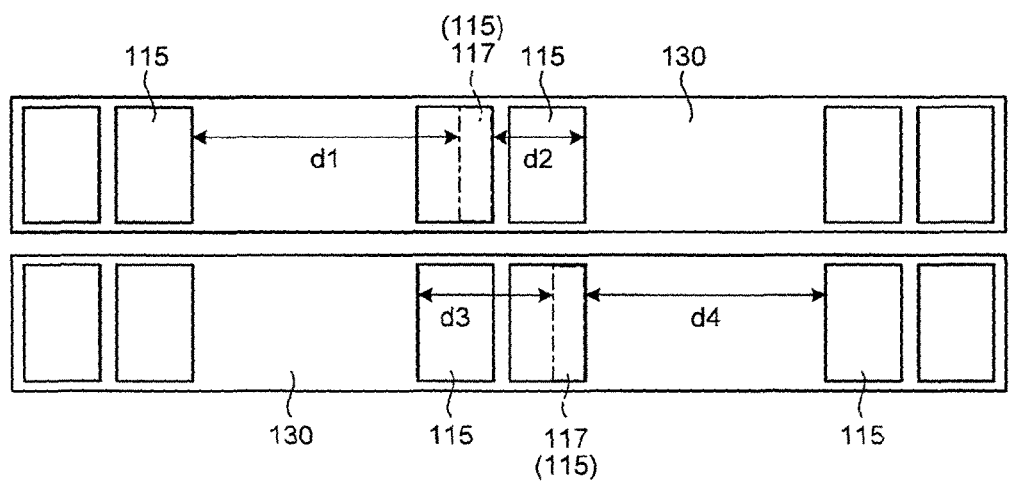
FIG. 26 is an illustration for illustrating checking for circumscribed rectangles (labels) that are likely to represent the numeral "1"

The following explains, with reference to FIGS. 25 and 26, exemplary target area identification for the numeral "1" in the embodiment. FIG. 25 is a flowchart of exemplary processing performed by the image-processing apparatus 200 according to the embodiment. FIG. 26 is an illustration for illustrating checking for circumscribed rectangles (labels) that are likely to represent the numeral "1".

As shown in FIGS. 25 and 26, the target area extracting unit 202e checks for the circumscribed rectangle (label 115) that is likely to represent the numeral "1". When the label 115 is disposed within the numeral display area (an identification line 130), the target area extracting unit 202e treats that particular label 115 as representing the numeral "1". For this, the target area extracting unit 202e first determines whether the label 115 is present to the right of an interest label 117 (step SD-1).

In this case, the interest label 117 is the label 115 that is likely to represent the numeral "1" as determined on the basis of the reference size and width-to-height ratio (see FIG. 15) of the label 115.

If the target area extracting unit 202e determined that the label 115 is present to the right of an interest label 117 (Yes at step SD-1), the processing is shifted to step SD-2.

The target area extracting unit 202e then determines whether a distance d between the label 115 disposed to the right of the interest label 117 and the interest label 117 satisfies a relation of d<d2 (step SD-2).

Where the symbol "d2" may be set in advance as, when the numeral "1" is used for a date, time of day, or the like in the image and the "1" is positioned in the tens place, a distance between the "1" and a numeral in the ones place.

If the target area extracting unit 202e determined that the distance d between the interest label 117 and the label 115 disposed to the right of the interest label 117 satisfies the relation of d<d2 (Yes at step SD-2), the target area extracting unit 202e terminates the processing and extracts the interest label 117 as representing the numeral "1".

If the target area extracting unit 202e determined that the distance d between the interest label 117 and the label 115 disposed to the right of the interest label 117 does not satisfy the relation of d<d2 (No at step SD-2), the processing is shifted to step SD-3.

The target area extracting unit 202e then determines whether the distance d satisfies a relation of d>d4 (step SD-3).

Where the symbol "d4" may be set in advance as, when the numeral "1" is used for a date, time of day, or the like in the image and the "1" is positioned in the ones place, a distance between the "1" and a numeral disposed to the right.

For example, when the date in the image is assigned in the order of "year, month, and day" and when "1" is used in the ones place of the numeral indicating the "month", d4 may be set in advance as the distance between the "1" in the ones place and the numeral indicating the "day" disposed to the right.

If the target area extracting unit 202e determined that the distance d between the interest label 117 and the label 115 disposed to the right of the interest label 117 satisfies the relation of d>d4 (Yes at step SD-3), the target area extracting unit 202e terminates the processing and extracts the interest label 117 as representing the numeral "1". Specifically, the interest label 117 may be extracted as the target area that is likely to represent the numeral "1".

If it is determined that the distance d between the interest label 117 and the label 115 disposed to the right of the interest label 117 does not satisfy the relation of d>d4 (No at step SD-3), the target area extracting unit 202e performs the processing at step SD-4.

The target area extracting unit 202e then removes the interest label 117 (step SD-4) and terminates the processing. Specifically, if the distance d between the interest label 117 and the label 115 disposed to the right of the interest label 117 satisfies neither the relation of d<d2 nor the relation of d>d4, the target area extracting unit 202e determines that the interest label 117 does not represent the numeral "1" and is noise. The target area extracting unit 202e thus removes the interest label 117 and exits from these steps.

If the target area extracting unit 202e determined that the label 115 is not present to the right of the interest label 117 (No at step SD-1), the processing is shifted to step SD-5.

The target area extracting unit 202e then determines whether the label 115 is present to the left of the interest label 117 (step SD-5).

If the target area extracting unit 202e determined that the label 115 is not present to the left of the interest label 117 (No at step SD-5), the processing is shifted to step SD-8.

If the target area extracting unit 202e determined that the label 115 is present to the left of the interest label 117 (Yes at step SD-5), the processing is shifted to step SD-6.

The target area extracting unit 202e then determines whether a distance d between the label 115 disposed to the left of the interest label 117 and the interest label 117 satisfies a relation of d<d3 (step SD-6).

Where the symbol "d3" may be set in advance as, when the numeral "1" is used for a date, time of day, or the like in the image and the "1" is positioned in the ones place, a distance between the "1" and a numeral in the tens place.

If the target area extracting unit 202e determined that the distance d between the interest label 117 and the label 115 disposed to the left of the interest label 117 satisfies the relation of d<d3 (Yes at step SD-6), the target area extracting unit 202e terminates the processing and extracts the interest label 117 as representing the numeral "1". Specifically, the target area extracting unit 202e may extract the interest label 117 as the target area that is likely to represent the numeral "1".

If the target area extracting unit 202e determined that the distance d between the interest label 117 and the label 115 disposed to the left of the interest label 117 does not satisfy the relation of d<d3 (No at step SD-6), the processing shifted to step SD-7.

The target area extracting unit 202e then determines whether the distance d satisfies a relation of d>d1 (step SD-7).

Where the symbol "d1" may be set in advance as, when the numeral "1" is used for a date, time of day, or the like in the image and the "1" is positioned in the tens place, a distance between the "1" and a numeral disposed to the left.

For example, when the date in the image is assigned in the order of "year, month, and day" and when "1" is used in the tens place of the numeral indicating the "month", d1 may be set in advance as the distance between the "1" in the tens place and the numeral indicating the "year" disposed to the left.

If the target area extracting unit 202e determined that the distance d between the interest label 117 and the label 115 disposed to the left of the interest label 117 satisfies the relation of d>d1 (Yes at step SD-7), the target area extracting unit 202e terminates the processing and extracts the interest label 117 as representing the numeral "1". Specifically, the target area extracting unit 202e may extract the interest label 117 as the target area that is likely to represent the numeral "1".

If the target area extracting unit 202e determined that the distance d between the interest label 117 and the label 115 disposed to the left of the interest label 117 does not satisfy the relation of d>d1 (No at step SD-7), the processing is shifted to step SD-8.

The target area extracting unit 202e then removes the interest label 117 (step SD-8) and terminates the processing. Specifically, if the distance d between the interest label 117 and the label 115 disposed to the left of the interest label 117 satisfies neither the relation of d<d3 nor the relation of d>d1, the target area extracting unit 202e determines that the interest label 117 does not represent the numeral "1" and is noise. The target area extracting unit 202e thus removes the interest label 117 and terminates the processing.

Returning to FIG. 3, the target area extracting unit 202e determines whether a predetermined number of extracted target areas are present (step SA-7). For example, to recognize a date, the target area extracting unit 202e may determine a maximum of eight digits (the Western calendar) or a maximum of six digits (the Japanese calendar) or the like, and to recognize time of day, the target area extracting unit 202e may determine a maximum of six digits (hours, minutes, and seconds) or a maximum of four digits (hours and minutes).

If the number of target areas, the distance between the target areas, the prefix and the suffix, the delimiter, and the like are not set in advance, the target area extracting unit 202e may shift the processing to step SA-11.

If the target area extracting unit 202e determined that the predetermined number of extracted target areas are present (Yes at step SA-7), the processing is shifted to step SA-8.

The display area isolating unit 202f isolates the numeral display area from the numeral recognition target range so as to include the target areas in a predetermined direction (along the height or width direction) (step SA-8), and terminates the processing.

Figure 27:
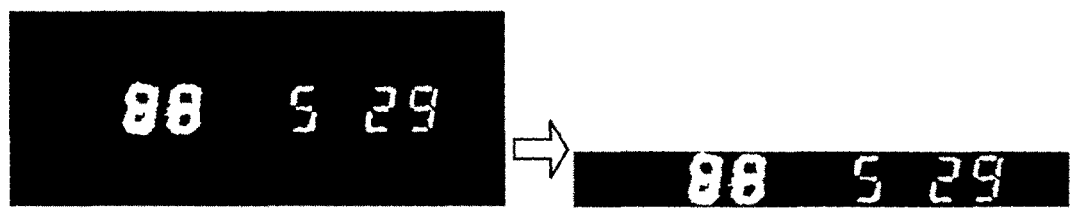
FIG. 27 is an illustration for illustrating exemplary isolation of a numeral display area in the embodiment.

The following explains, with reference to FIG. 27, exemplary isolation of the numeral display area in the embodiment. FIG. 27 is an illustration for illustrating the exemplary isolation of the numeral display area in the embodiment.

As shown in FIG. 27, the display area isolating unit 202f identifies and isolates from the numeral recognition target range, as the height of the numeral display area, the highest point and the lowest point in the target area extracted by the target area extracting unit 202e.

Returning to FIG. 3, if the target area extracting unit 202e determined that the predetermined number of extracted target areas are not present (No at step SA-7), the processing is shifted to step SA-9.

The perpendicularly isolating unit 202g determines whether a predetermined delimiter is present in the numeral display area (step SA-9).

If the perpendicularly isolating unit 202g determined that the predetermined delimiter is present in the numeral display area (Yes at step SA-9), the processing is shifted to step SA-10.

The perpendicularly isolating unit 202g then identifies the circumscribed rectangles at both extremes in a predetermined direction from the delimiter (estimates the numeral range) and then isolates the isolated numeral display area perpendicularly to the predetermined direction at the both extreme positions (step SA-10), and terminates the processing.

The following explains, with reference to FIGS. 28 to 33, exemplary perpendicular isolating in the embodiment. FIGS. 28 to 33 are illustrations for illustrating the exemplary perpendicular isolation in the embodiment.

Figure 28:
FIG. 28 is an illustration for illustrating exemplary perpendicular isolation in the embodiment.

As shown in FIG. 28, when the target areas of the numerals to be recognized or the distance between the target areas are determined in advance and if the predetermined number (six) of target areas are detected, the perpendicularly isolating unit 202g identifies data from the leftmost target area to the rightmost target area as the isolated numeral display area.

Figure 29:
FIG. 29 is an illustration for illustrating exemplary perpendicular isolation in the embodiment.

Alternatively, as shown in FIG. 29, when one or both of a prefix and a suffix (e.g., an era name or a symbol) are determined in advance and if one or both of the predetermined prefix and the predetermined suffix are detected, the perpendicularly isolating unit 202g identifies data from the prefix (Showa) to the suffix (day) as the isolated numeral display area.

Figure 30:
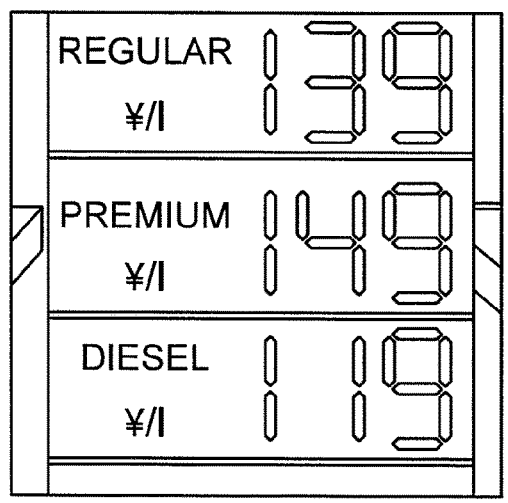
FIG. 30 is an illustration for illustrating exemplary perpendicular isolation in the embodiment.

For example, in a gas price signboard at a filling station or the like as shown in FIG. 30, the perpendicularly isolating unit 202g may detect a predetermined prefix (¥/1) to thereby identify the isolated numeral display area.

In a case in which the target to be identified is a date, time of day, or the like, any one, some, or all of ".", ":", and "/" may be used as delimiters. In such a case, the number of target areas may not satisfy a predetermined number or the prefix or the suffix may not be detected. Then, the perpendicularly isolating unit 202g may determine whether a delimiter is used and, if a delimiter is used, perpendicularly isolating unit may identify the isolated numeral display area on the basis of the delimiter.

Figure 31:
FIG. 31 is an illustration for illustrating exemplary perpendicular isolation in the embodiment.

As shown in FIG. 31, when a recognized target area begins with a delimiter "." and the Western calendar is assumed to be displayed in two digits, the perpendicularly isolating unit 202g may determine that a hidden target area is present to the left of the displayed target area. The perpendicularly isolating unit 202g may then calculate the number of hidden digits and the distance between numerals on the basis of, for example, any one, some, or all of a predetermined rectangle size, distance between numerals, and other rectangle sizes, and thereby identify the isolated numeral display area in consideration of a size required for the hidden digits.

Figure 32:
FIG. 32 is an illustration for illustrating exemplary perpendicular isolation in the embodiment.

Alternatively, as shown in FIG. 32, when a delimiter "." is present between the recognized target areas and the Western calendar is assumed to be displayed in two digits, the perpendicularly isolating unit 202g may determine that a hidden target area is present between the displayed target areas. The perpendicularly isolating unit 202g may then identify data from the leftmost target area to the rightmost target area as the isolated numeral display area.

Figure 33:
FIG. 33 is an illustration for illustrating exemplary perpendicular isolation in the embodiment.

Still alternatively, as shown in FIG. 33, when a recognized target area ends with a delimiter "." and the Western calendar is assumed to be displayed in two digits, the perpendicularly isolating unit 202g may determine that a hidden target area is present to the right of the displayed target area. The perpendicularly isolating unit 202g may then calculate the number of hidden digits and the distance between numerals on the basis of, for example, any one, some, or all of the predetermined rectangle size, distance between numerals, and other rectangle sizes, and thereby identify the isolated numeral display area in consideration of a size required for the hidden digits.

Returning to FIG. 3, if the perpendicularly isolating unit 202g determined that the predetermined delimiter is not present (No at step SA-9), the processing is shifted to step SA-11.

The control unit 202 determines whether all processing of the binarization, the labeling, and the proximity consolidation has been performed with changed parameters (step SA-11).

If the control unit 202 determined that all processing of the binarization, the labeling, and the proximity consolidation has not been performed with changed parameters (No at step SA-11), the processing is shifted to step SA-12.

The control unit 202 determines that the identification of the numeral likelihood portion is not sufficient and changes parameters (for example, the thresholds based on luminance and hue) (step SA-12), and shifts the processing to step SA-2.

If the control unit 202 determined that all processing of the binarization, the labeling, and the proximity consolidation has been performed with changed parameters (Yes at step SA-11), the processing is shifted to step SA-13.

The control unit 202 determines whether all other numeral recognition target ranges identified by the target range identifying unit 202a have been processed (checked) (step SA-13).

If the control unit 202 determined that all other numeral recognition target ranges identified by the target range identifying unit 202a have been processed (Yes at step SA-13), the processing is shifted to step SA-14.

The control unit 202 then determines that no numerals are present in the image (step SA-14), and terminates the processing.

If the control unit 202 determined that all other numeral recognition target ranges identified by the target range identifying unit 202a have not been processed (No at step SA-13), the processing is shifted to step SA-15.

The control unit 202 then determines that the numeral recognition target range was wrong and controls to cause the target range identifying unit 202a to identify another numeral recognition target range (step SA-15), and shifts the processing to step SA-1.

Continuous Recognition Process

Figure 34:
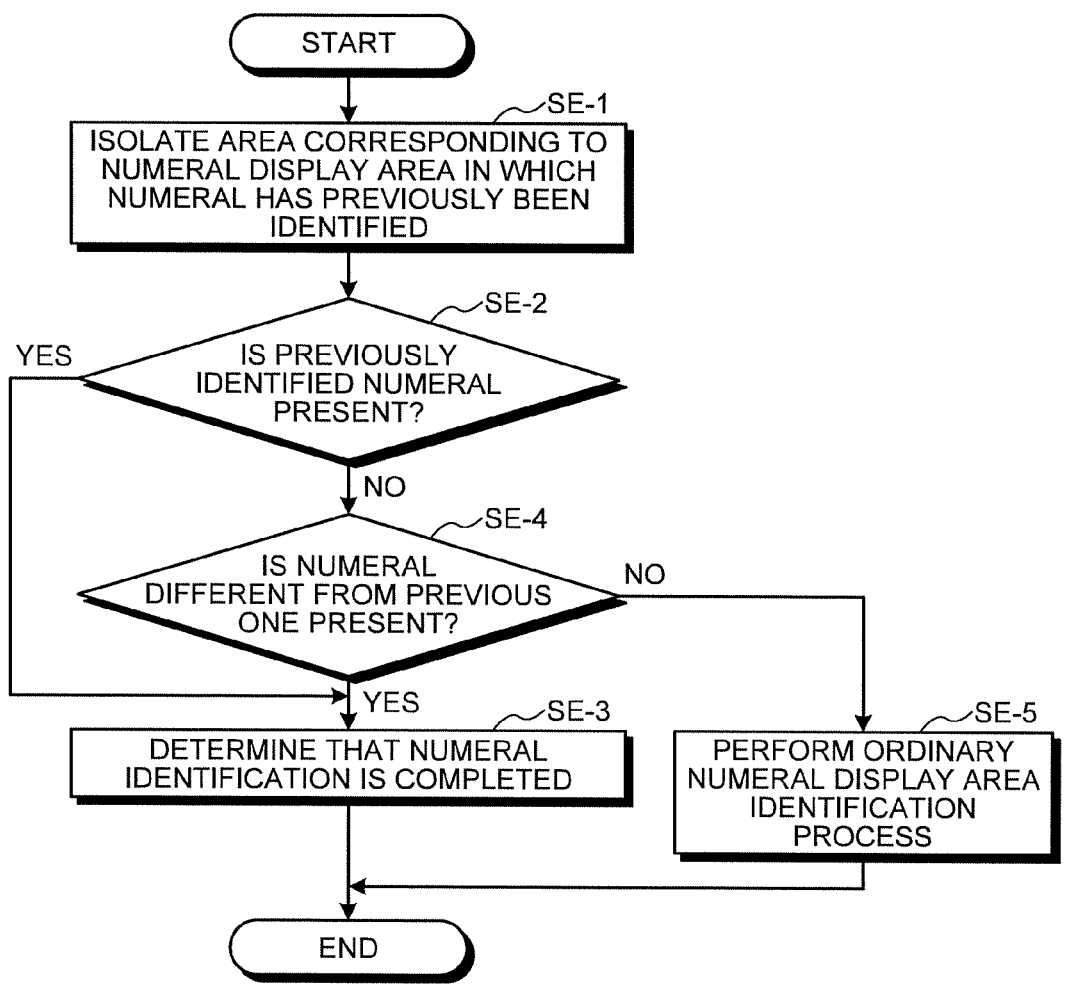
FIG. 34 is a flowchart of exemplary processing performed by the image-processing apparatus according to the embodiment.

The following explains, with reference to FIG. 34, an exemplary continuous recognition process perform by the image-processing apparatus 200 according to the embodiment. FIG. 34 is a flowchart of the exemplary processing performed by the image-processing apparatus 200 according to the embodiment.

As shown in FIG. 34, the continuous recognition area isolating unit 202h isolates, as a continuous recognition area, an area that corresponds, in an image in which the numeral display area is not identified, to the numeral display area or the isolated numeral display area based on the numeral display area data stored in the numeral display area database 206a, of the image in which a numeral has previously been identified (step SE-1).

The continuous numeral identifying unit 202j identifies a numeral from the continuous recognition area and determines whether the previously identified numeral is present (step SE-2).

The continuous numeral identifying unit 202j may identify the numeral from the continuous recognition area through OCR. Alternatively, the continuous numeral identifying unit 202j may perform a histogram on the numeral display area data of the continuous recognition area using a plurality of lines and identify the numeral on the basis of a peak count in each of the lines.

Figure 35:
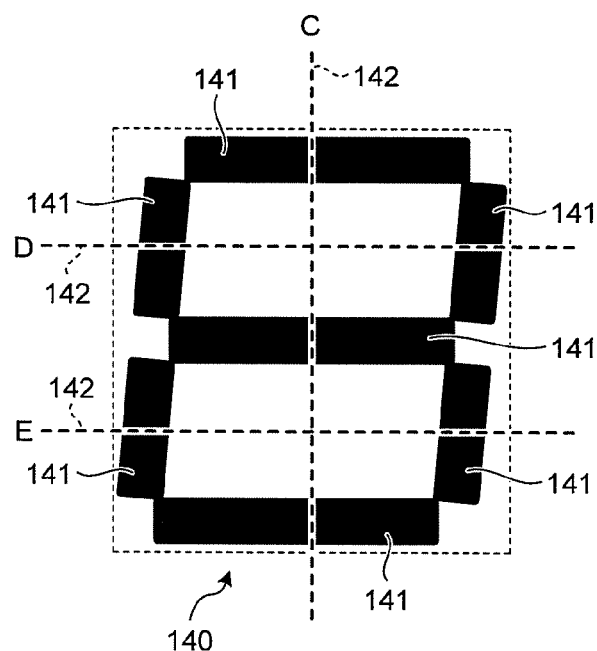
FIG. 35 is an illustration for illustrating a projection histogram technique.
Figure 36:
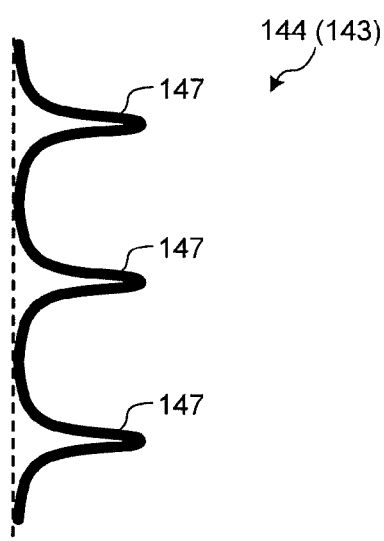
FIG. 36 is an illustration for illustrating a histogram performed on target area data using a projection line.

The following explains, with reference to FIGS. 35 to 39, exemplary numeral identification in the embodiment. FIG. 35 is an illustration for illustrating a projection histogram technique. FIGS. 36 to 38 are illustrations for illustrating a histogram performed on target area data using a projection line. FIG. 39 is a figure illustrating a relation between peak portions of the projection histogram and a numeral when the numeral is to be identified on the basis of the peak portions.

As shown in FIG. 35, when a projection histogram is performed on the target area (label 115) that is likely to be identifiable as a numeral, the numeral identifying unit 202i or the continuous numeral identifying unit 202j sets a projection line 142 at a position on the target area data at which a segment 141 that constitutes a numeral can be extracted.

Specifically, the numeral identifying unit 202i or the continuous numeral identifying unit 202j is intended for use in identifying a numeral when the numeral to be identified is a seven-segment character 140 composed of seven segments 141, so that the projection line 142 is set at the position at which the seven-segment character 140 can be identified.

Specifically, the seven-segment character 140 is composed of seven segments arranged as follows: three horizontal segments 141 extending in the width direction and disposed at an upper end, a center, and a lower end of the seven-segment character 140; two vertical segments 141 disposed on left and right ends of the two horizontal segments 141 disposed at the upper end and the center of the seven-segment character 140 in the height direction to thereby connect the two horizontal segments 141; and two vertical segments 141 disposed on left and right ends of the two horizontal segments 141 disposed at the center and the lower end of the seven-segment character 140 in the height direction to thereby connect the two horizontal segments 141.

To extract the states of the seven segments 141, three projection lines 142 of line C, line D, and line E are set. Of these three lines, line C is projected in the height direction at a position near a center of the target area data in the width direction to extract a histogram, whereby the states of the three horizontal segments 141 arranged in the height direction are extracted.

Line D is projected in the with direction at a position between the horizontal segment 141 disposed at the upper end in the height direction and the horizontal segment 141 disposed at the center in the height direction to extract a histogram, whereby the states of the two vertical segments 141 disposed at the left and right ends of the two horizontal segments 141 are extracted.

Line E is projected in the with direction at a position between the horizontal segment 141 disposed at the center in the height direction and the horizontal segment 141 disposed at the lower end in the height direction to extract a histogram, whereby the states of the two vertical segments 141 disposed at the left and right ends of the two horizontal segments 141 are extracted.

As such, the numeral identifying unit 202i or the continuous numeral identifying unit 202j performs a histogram on the target area data using the projection lines 142 of line C, line D, and line E, thereby identifying the numeral on the basis of a peak count in each of the three lines.

As shown in FIG. 36, performing the histogram on the target area data shown in FIG. 35 using the three projection lines 142 yields a result of a projection histogram 143 on which portions at which the segments 141 are disposed appear as histogram peak portions 147.

For example, the numeral "8" may be indicated by the seven-segment character 140 on the target area data as shown in FIG. 35. In this case, three peak portions 147 corresponding to the three horizontal segments 141 arranged in the height direction appear in a line-C histogram 144 as the projection histogram 143 using the line-C projection line 142.

As shown in FIG. 37, when the histogram is performed on the target area data shown in FIG. 35 using the line-D projection line, two peak portions 147 appear in the line-D histogram 145 as the projection histogram 143 along the line-D projection line 142, corresponding to two vertical segments 141 disposed at the left and right ends of the horizontal segment 141 disposed at the upper end in the height direction and the horizontal segment 141 disposed at the center in the height direction.

As shown in FIG. 38, when the histogram is performed on the target area data shown in FIG. 35 using the line-E projection line, two peak portions 147 appear in the line-E histogram 146 as the projection histogram 143 along the line-E projection line 142, corresponding to two vertical segments 141 disposed at the left and right ends of the horizontal segment 141 disposed at the center in the height direction and the horizontal segment 141 disposed at the lower end in the height direction.

As such, the numeral identifying unit 202i or the continuous numeral identifying unit 202j identifies the numeral indicated by the target area data on the basis of the number of peak portions 147 appearing in the projection histogram 143.

FIG. 39 shows a relation between the peak portions 147 and a numeral indicated by the seven-segment character 140 when the numeral is to be identified on the basis of the peak portions 147 of the projection histogram 143.

Consider, for example, a case in which, as shown in FIG. 39, three peak portions 147 appear in the line-C histogram 144, one peak portion 147 appears only at a position corresponding to the right vertical segment 141 in the line-D histogram 145, and one peak portion 147 appears only at a position corresponding to the left vertical segment 141 in the line-E histogram 146. This case leads to a reasonable determination that the numeral "2" formed of the seven-segment character 140 appears on the target area data.

The numeral identifying unit 202i or the continuous numeral identifying unit 202j may identify the numeral "1" on the basis of the number of peak portions 147 in each projection histogram 143 in the target area data and the abovementioned distance between the interest label 117 and the label 115 adjacent thereto, specifically, the distance between the two pieces of the target area data adjacent to each other.

Returning to FIG. 34, if the continuous numeral identifying unit 202j determined that the previously identified numeral is present (Yes at step SE-2), the processing is shifted to step SE-3.

The continuous numeral identifying unit 202j then determines that the numeral identification is completed (step SE-3), and terminates the processing.

If the continuous numeral identifying unit 202j determined that the previously identified numeral is not present (No at step SE-2), the processing is shifted to step SE-4.

The continuous numeral identifying unit 202j determines whether a numeral different from the previously identified numeral is present in the continuous recognition area (step SE-4).

If the continuous numeral identifying unit 202j determined that a numeral different from the previously identified numeral is present in the continuous recognition area (Yes at step SE-4), the processing is shifted to step SE-3.

If the continuous numeral identifying unit 202j determined that a numeral different from the previously identified numeral is not present in the continuous recognition area (No at step SE-4), the processing is shifted to step SE-5.

The control unit 202 then performs an ordinary numeral display area identifying process (step SE-5), and terminates the processing. Specifically, if a numeral cannot be recognized as a result of the continuous recognition process, the control unit 202 allows a numeral display area to be identified again through the numeral display area identifying process shown in FIG. 3 and the like.

In continuous recognition of the numeral display area or the isolated numeral display area performed in the embodiment, an image having the same numeral display area or isolated numeral display area can be subjected to image processing repeatedly as explained above.

Thus, the embodiment enables considerable reduction in the amount of calculations required when subjecting continuously photographed images or the like to image processing by one or both of the following: using the numeral display area or the isolated numeral display area identified last or earlier to thereby identify the numeral display area or the isolated numeral display area of the image to be recognized; and using an individual numeral or a plurality of numerals identified last or earlier to thereby determine presence of a numeral.

FIRST EXAMPLE

Figure 40:
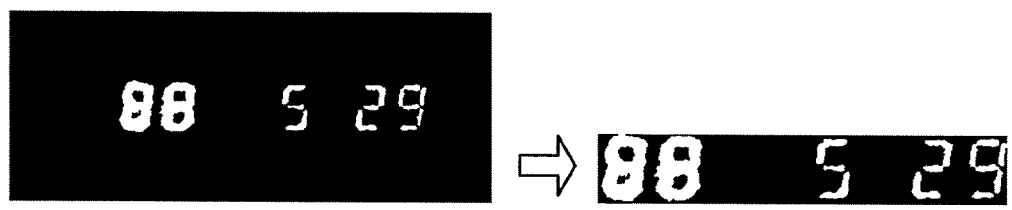
FIG. 40 is an illustration for illustrating an exemplary numeral display area identifying process in the embodiment.
Figure 41:
FIG. 41 is an illustration for illustrating an exemplary numeral display area identifying process in the embodiment.
Figure 42:
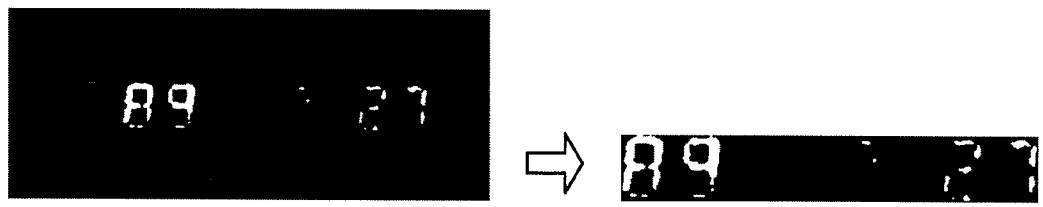
FIG. 42 is an illustration for illustrating an exemplary numeral display area identifying process in the embodiment.

The following explains, with reference to FIGS. 40 to 42, an example in which the image-processing apparatus 200 according to the embodiment is configured as a portable image capturing device. FIGS. 40 to 42 are illustrations for illustrating an exemplary numeral display area identifying process in the embodiment.

The image-processing apparatus (portable image capturing device) 200 automatically recognizes a date printed on an old photo through OCR when the old photo is photographed and digitized. To recognize the date, the portable image capturing device 200 finds a numeral from results of processing performed for recognizing the date, including binarization, labeling, and proximity integration. Because it is difficult to recognize all dates through a single processing sequence, the processing of binarization, labeling, and proximity integration is often performed a number of times.

Thus, the portable image capturing device 200 uses the numeral display area identifying process in the embodiment to thereby minimize the range over which numerals are identified, thus increasing the speed at which the second and subsequence sequences of processing are performed and reducing cases of false recognition.

As shown in FIG. 40, for example, when the date in the image is clearly identifiable, the portable image capturing device 200 uses the numeral display area identifying process in the embodiment to thereby isolate the isolated numeral display area.

When the image contains a lot of noise, specifically, when the upper portion of a numeral "3" before isolation has the same color as the background so that the numeral "3" cannot be mechanically identified as a numeral as shown in FIG. 41, the portable image capturing device 200 is generally required to perform two or more recognition sequences. The numeral display area identifying process in the embodiment is, however, used to remove the noise, which allows the isolated numeral display area to be identified.

The foregoing arrangement allows the portable image capturing device 200 to remove the portion of the numeral "3" having the same color as the background to thereby narrow down the numeral identification range, so that the numeral identification accuracy can be enhanced and the processing can be performed at faster speeds.

When part of the date is illegible, specifically, when the "month" portion is so faint as not to be mechanically determinable as a numeral as shown in FIG. 42, the portable image capturing device 200 is generally required to perform two or more recognition sequences. The portable image capturing device 200, however, uses an image in which the isolated numeral display area is identified through the numeral display area identifying process in the embodiment to thereby perform processing from the binarization to numeral identification, so that the processing can be performed at faster speeds and the numeral identification accuracy can be enhanced.

SECOND EXAMPLE

The following explains, with reference to FIGS. 43 to 46, an example in which the image-processing apparatus 200 according to the embodiment is configured as a date identification apparatus.

Figure 43:
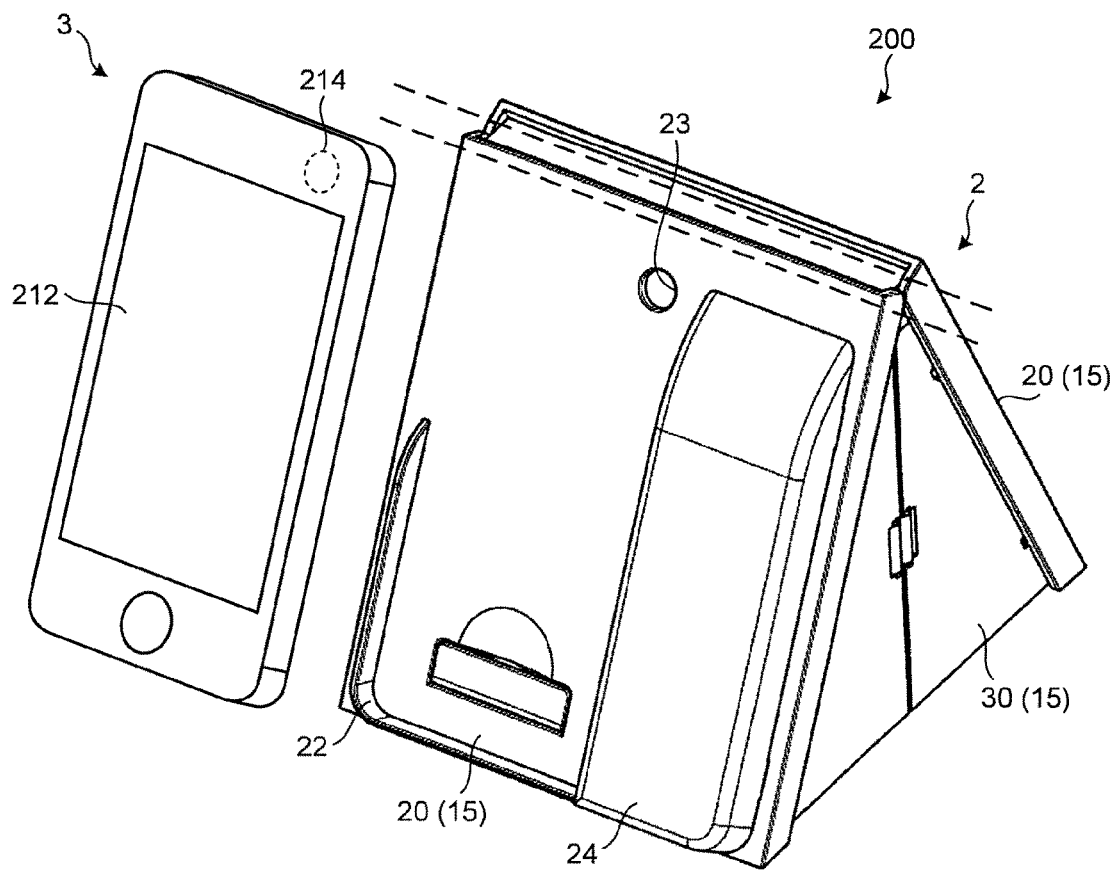
FIG. 43 is an illustration of an appearance of a date identification apparatus according to the embodiment.
Figure 43:
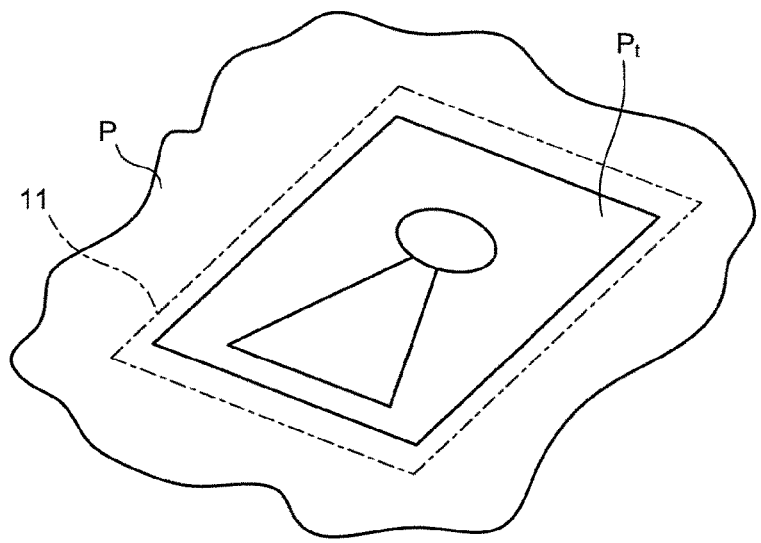
Figure 44:
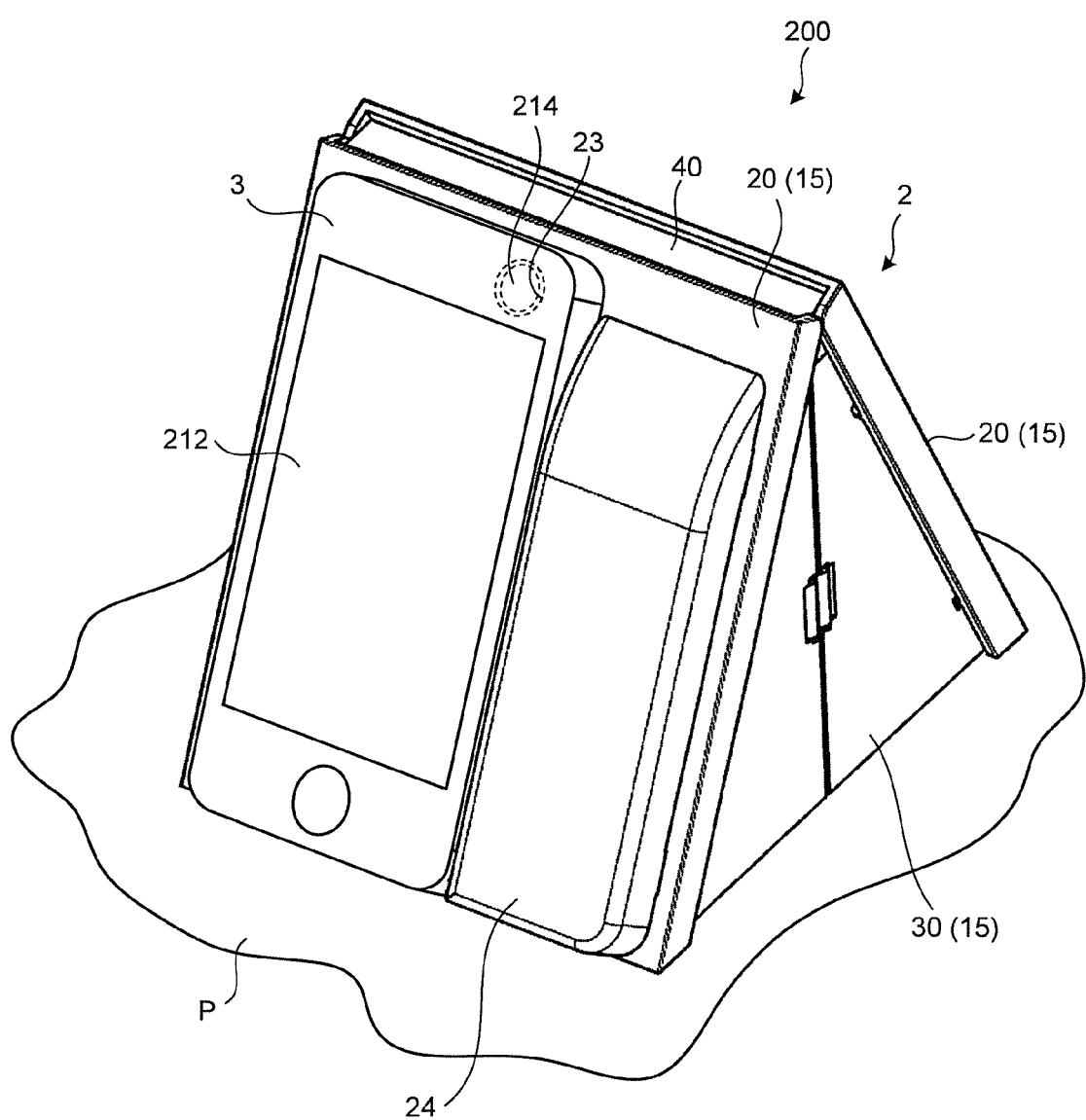
FIG. 44 is an illustration illustrating a use condition of the date identification apparatus according to the embodiment.
Figure 45:
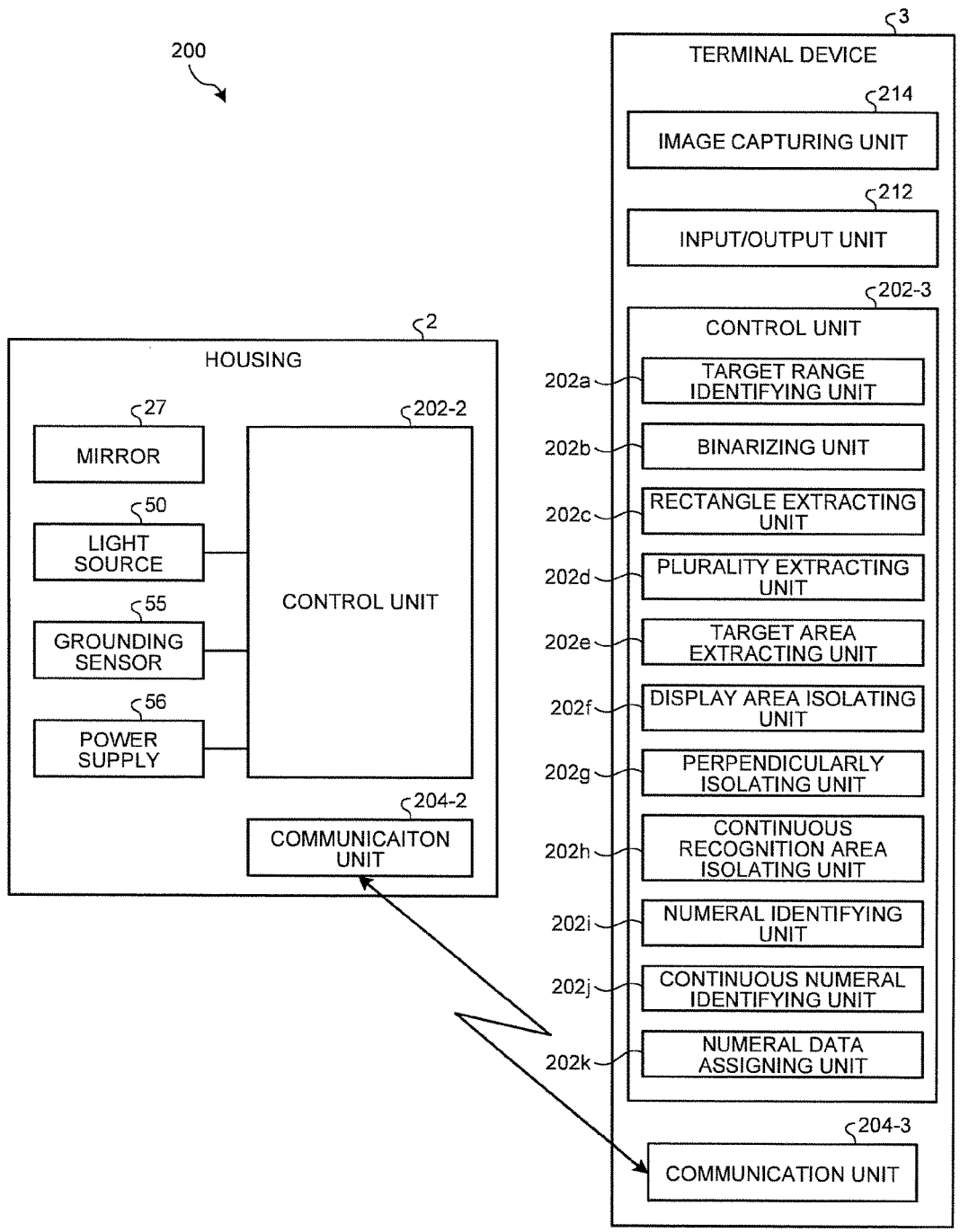
FIG. 45 is a block diagram of an exemplary configuration of the date identification apparatus according to the embodiment.

The following explains, with reference to FIGS. 43 to 45, an exemplary configuration of the image-processing apparatus (date identification apparatus) 200 according to the embodiment. FIG. 43 is an illustration of an appearance of the date identification apparatus 200 according to the embodiment. FIG. 44 is an illustration for illustrating a use condition of the date identification apparatus 200 according to the embodiment. FIG. 45 is a block diagram of an exemplary configuration of the date identification apparatus 200 according to the embodiment.

As shown in FIGS. 43 and 44, this date identification apparatus 200 according to the embodiment has a hand-carrying size. The date identification apparatus 200 includes an image capturing unit 214 that captures an image of a medium P to thereby generate image data corresponding to the medium P. The date identification apparatus 200 in the embodiment uses as the medium P a photo album in which silver halide photos and printed photos are compiled, to read a single photo in the photo album as a read target area Pt, thereby generating image data corresponding to the single photo in the photo album.

Intended uses of the date identification apparatus 200 in the embodiment are not limited to what is mentioned above. The date identification apparatus 200 of the embodiment can be applied to any types of medium on which image data is created by a user. The date identification apparatus 200 is applicable to generating image data corresponding to image data not only on glossy paper (such as a single silver halide photo, a single printed photo, and a magazine), but also on plain paper.

As shown in FIG. 43, the date identification apparatus 200 includes a housing 2 and a terminal device 3. The terminal device 3 includes the image capturing unit 214 that captures an image of an object, and an input/output unit 212 that displays any type of information. The image capturing unit 214 and the input/output unit 212 are disposed on faces of the terminal device 3 facing in opposite directions from each other.

The terminal device 3 is used by installing therein a read application program corresponding to the function as the date identification apparatus 200 in advance or loading thereon the read application program from a recording medium (or downloaded). The terminal device 3 in the embodiment may, for example, be a smartphone, a tablet, or other portable terminal that has telephone, Internet connection, and other functions. The terminal device 3 has the function as the date identification apparatus 200 as part of its functions.

The housing 2 is capable of holding the terminal device 3 by being formed for an intended use with the terminal device 3 having defined outline dimensions and having the image capturing unit 214 at a defined position thereof or having outline dimensions falling within a predetermined range and having the image capturing unit 214 at a position falling within a predetermined range. Specifically, for example, the housing 2 is formed for an intended use with the terminal device 3 in the same series. The housing 2 holds thereon the terminal device 3 when the date identification apparatus 200 reads the read target area Pt of the medium P.

The housing 2 is formed substantially into a triangular prism. Of three rectangular, what is called side surfaces that constitute the triangular prism, one side surface is open to form a rectangular opening 11. The opening 11 is formed to have an area such that a photo with at least a size L (89 mm×127 mm) can be fit inside the opening 11.

The opening 11 preferably has an area that allows a gap to be formed between an outer edge of the opening 11 and an outer edge of the photo in a condition in which the center of the L-sized photo is aligned with the center of the opening 11, the area being, for example, 102 mm×140 mm.

When the date identification apparatus 200 is in a use position, the housing 2 is positioned so that the opening 11 is disposed on a lower side to be open downwardly. To state the foregoing differently, the housing 2 has the opening 11 formed in a bottom surface thereof. Because of the opening 11 formed in the bottom surface as described above, the housing 2 can block thereinside ambient light that illuminates the housing 2 from an ambience of the housing 2.

The housing 2 formed as described above includes two side surfaces excluding the bottom surface of the three side surfaces constituting the triangular prism as the shape of the housing 2 and two triangular bases constituting the triangular prism. Each of the two side surfaces and the two triangular bases is formed as a covering portion 15. The four covering portions 15 are each associated with a corresponding one of four sides of the rectangular opening 11.

The four covering portions 15 comprise two sets of covering portions 15, each set comprising two covering portions 15 that face each other. Of the two sets of covering portions 15, one set of covering portions 15 forms inclined covering portions 20. The inclined covering portions 20 are inclined in directions in which the covering portions 15 come closer together toward end portion sides opposite to sides on which the opening 11 is disposed. Specifically, the inclined covering portions 20 are formed of the two side surfaces, excepting the bottom surface, of the three side surfaces that constitute the triangular prism shape of the housing 2.

A first inclined covering portion that is one of the two inclined covering portions 20 includes a device holding section 22, an image capturing opening 23, and a power supply housing section 24. Specifically, the device holding section 22 holds thereon the terminal device 3. The image capturing opening 23 serves as an opening through which the terminal device 3 captures an image of the medium P. The power supply housing section 24 houses therein a power supply 56 (see FIG. 45), such as a battery (not shown), used in the housing 2.

The image capturing opening 23 has a hole that passes through the first inclined covering portion, providing communication between an outer surface side and an inner surface side of the housing 2 in the first inclined covering portion.

The device holding section 22 is formed on the outer surface side of the housing 2 in the first inclined covering portion. The device holding section 22 is formed so as to be able to hold the terminal device 3 at a position on the outer surface side of the housing 2 in the first inclined covering portion, so that the image capturing unit 214 of the terminal device 3 is positioned at a portion at which the image capturing opening 23 is formed.

When the terminal device 3 is held on the device holding section 22, the image capturing unit 214 is positioned at the position at which the image capturing opening 23 is formed. As a result, the image capturing unit 214 can capture an image of the medium P exposed to an inside of the housing 2 in the opening 11.

The first inclined covering portion includes a grounding sensor 55 (see FIG. 45) that serves as a closure detector detecting that the opening 11 is covered. The grounding sensor 55 is disposed on the side of the bottom surface in the first inclined covering portion.

A second inclined covering portion that is the other of the two inclined covering portions 20 includes a mirror 27 (see FIG. 45) disposed on a surface thereof corresponding to the inner surface side of the housing 2. The mirror 27 on the inner surface side of the second inclined covering portion is disposed so as to reflect an image of the medium P exposed to a housing inside in the opening 11 to thereby allow the image capturing unit 214 to capture a reflected mirror image.

Positional relations among the mirror 27, the image capturing unit 214 of the terminal device 3 held on the device holding section 22, and the opening 11 are set such that an image capturing area of the image capturing unit 214 through the mirror 27 is equal to, or wider than, an area of the opening 11.

This arrangement enables the image capturing unit 214 to capture an image of an entire area of the medium P exposed to the housing inside in the opening 11 in a condition in which the image capturing unit 214 is positioned at the position of the image capturing opening 23 by the terminal device 3 being held on the device holding section 22.

Of the four covering portions 15 in two sets, each set comprising two covering portions 15 that face each other, the other set of covering portions 15 serves as connecting covering portions 30, each connecting the two inclined covering portions 20 together. The connecting covering portions 30 are formed by the two, what is called bases that constitute the triangular prism as the shape of the housing 2.

Of the covering portions 15, the two inclined covering portions 20 are arranged such that a first inclined covering portion 20 is relatively movable with respect to a second inclined covering portion 20. This arrangement results in the inclined covering portions 20 taking either one of two different positions, one being an open position in which end portions of the two inclined covering portions 20 on the side adjacent to the opening 11 are spaced apart from each other and the other being a folded position in which the two inclined covering portions 20 extend in parallel with each other.

Specifically, the two inclined covering portions 20 each have a pivotal shaft that is disposed on the end portion side opposite to the side on which the opening 11 is disposed and that extends across the two connecting covering portions 30. The inclined covering portions 20 are each capable of rotating about the pivotal shaft.

The pivotal shaft is disposed on the end portion side in the inclined covering portion 20, opposite to the side on which the opening 11 is disposed so as to allow the inclined covering portion 20 to rotatably connect to a rotary covering portion 40 that extends from a side on which a first connecting covering portion 30 is disposed to the other side on which a second connecting covering portion 30 is disposed.

The connecting covering portions 30 each include a plurality of rotating members connected rotatably to each other. Specifically, the two connecting covering portions 30 are each divided into two parts, one being a portion connected rotatably to the first inclined covering portion and the other being a portion connected rotatably to the second inclined covering portion. The divided parts each constitute the rotating member.

The two rotating members of one connecting covering portion 30 are connected rotatably to each other by connecting members. Thus, the connecting covering portion 30 includes the rotating members that are connected rotatably to each other and connected rotatably to the respective inclined covering portions 20. When the two inclined covering portions 20 are in the folded position, the foregoing arrangement of the rotating members allows the connecting covering portions 30 to be deformed with respect to the inclined covering portions 20 to thereby enter a space between the two inclined covering portions 20.

A plurality of light sources 50 (see FIG. 45) are disposed in the housing inside. The light sources 50 are disposed so as to be able to emit light toward the opening 11 to thereby illuminate different areas on a horizontal plane in the opening 11. The light sources 50 disposed in the housing inside are disposed on the inner surface side of the housing 2 in the connecting covering portions 30 and mounted on the two rotating members of each of the connecting covering portions 30.

For example, the light sources 50 are disposed at four places in the housing inside. The light sources 50 disposed in the housing inside each forma light emitting module that includes a plurality of light emitting elements, such as light emitting diodes (LEDs) and laser diodes (LDs), arranged in a band shape. The light sources 50 receive electric power supplied from the power supply 56 to light up, thereby emitting light.

As shown in FIG. 45, the housing 2 that constitutes the date identification apparatus 200 with the terminal device 3 includes the mirror 27, the light sources 50, the grounding sensor 55, the power supply 56, a control unit (housing control unit) 202-2, and a communication unit 204-2.

The light sources 50 and the grounding sensor 55 are electrically connected to the housing control unit 202-2. Thus, the housing control unit 202-2 can control to turn on or off the light sources 50 and receive a result of detection made by the grounding sensor 55.

Specifically, the housing control unit 202-2 has a function of controlling turning on and off of the light sources 50. Through the control by the housing control unit 202-2, the light sources 50 can control an intensity of light and timings of the turning on and off. At this time, the housing control unit 202-2 can refer to the result of detection made by the grounding sensor 55 to control the turning on and off of the light sources 50.

The power supply 56 housed in the power supply housing section 24 is also connected electrically to the housing control unit 202-2. The electric parts in the housing 2 are operable by the electric power supplied from the power supply 56. Non-limiting examples of the power supply 56 that supplies the electric power for operating the parts of the housing 2 include a primary battery, a secondary battery, and other types of batteries.

The housing 2 performs wireless communication with terminal device 3 via the communication unit 204-2 through, for example, Bluetooth (a registered trademark).

The terminal device 3 includes the image capturing unit 214, the input/output unit 212, a control unit (external device control unit) 202-3, and a communication unit 204-3. The terminal device 3 may further include a power supply unit (not shown) and a storage unit 206 (not shown).

Of these components, the image capturing unit 214 is disposed on a reverse surface (a surface opposite to a surface on which the input/output unit 212 is disposed) of the terminal device 3.

The input/output unit 212 can display any image such as an image captured by the image capturing unit 214. The input/output unit 212 is disposed on the front surface of the terminal device 3 and serves as a display that includes a liquid crystal display, an organic EL display, or other type of display driven by electric power from the power supply unit of the terminal device 3.

In addition to the function as an output unit of the terminal device 3, the input/output unit 212 serves also as a touch panel display having a function as an input unit. The input/output unit 212 thus can output an electric signal representing any position on the input/output unit 212 touched by the user. This arrangement allows the user to perform any input operation to the terminal device 3.

Additionally, the external device control unit 202-3 can control the image capturing unit 214 and process images captured by the image capturing unit 214. The external device control unit 202-3 may include elements from a target range identifying unit 202a to a numeral data assigning unit 202k.

The communication unit 204-3 can perform communication with the communication unit 204-2 of the housing 2 through, for example, Bluetooth (a registered trademark). The housing 2 can perform wireless communication with the terminal device 3 via the communication unit 204-2 and the communication unit 204-3.

Figure 46:
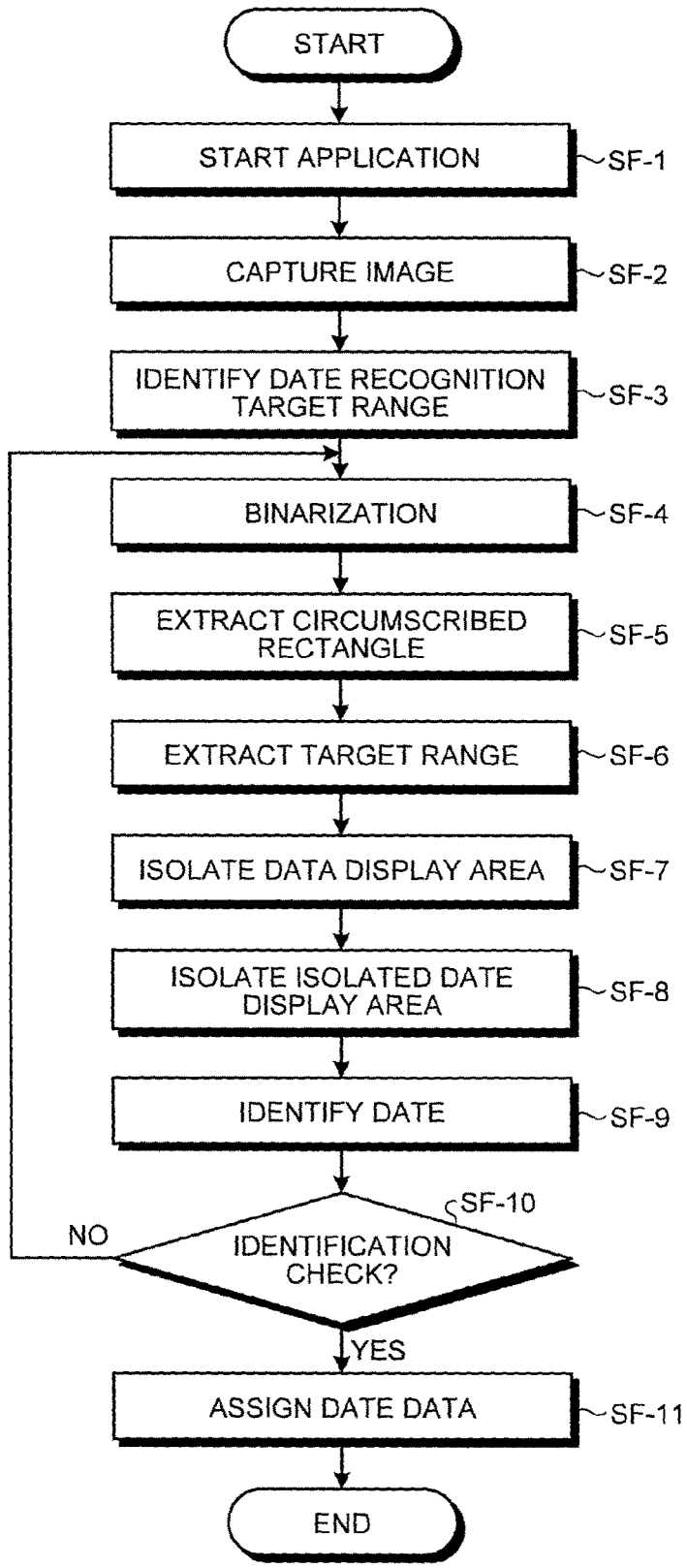
FIG. 46 is a flowchart of exemplary processing performed by the date identification apparatus according to the embodiment.

The following explains, with reference to FIG. 46, an exemplary date identification process in the embodiment. FIG. 46 is a flowchart illustrating exemplary processing performed by the date identification apparatus 200 in the embodiment.

As shown in FIG. 46, assume a process in which an image of a photo to which a date is assigned is captured as the read target area Pt by the date identification apparatus 200, the date is identified from the image data obtained in the capturing, and date data of the identified date is assigned to the image data. When a start command is input by the user through the input/output unit 212, the control unit 202 starts an application program for performing the process (step SF-1).

The control unit 202 controls the image capturing unit 214 to thereby capture the image of the medium P (step SF-2). At this time, an input operation for directing image capturing is performed, with the housing 2 placed over the medium P, on the input/output unit 212 of the terminal device 3 held on the device holding section 22 of the housing 2, to thereby capture the image of the medium P that is the photo to which a date is assigned.

The target range identifying unit 202a identifies the date recognition target range in the image based on the captured image data (step SF-3).

The binarizing unit 202b binarizes the date recognition target range data of the date recognition target range using the threshold based on luminance and hue, to thereby acquire the binarizing range data (step SF-4).

The rectangle extracting unit 202c subjects the binarizing range data to labeling to thereby extract, in the binarizing range based on the binarizing range data, the numeral likelihood portion that is likely to represent a numeral. When the circumscribed rectangle of the numeral likelihood portion conforms to the reference size, the rectangle extracting unit 202c extracts the circumscribed rectangle (step SF-5).

When a plurality of circumscribed rectangles having an identical height or width are arrayed, the plurality extracting unit 202d extracts the circumscribed rectangles having the identical height or width (step SF-6).

The target area extracting unit 202e determines whether the circumscribed rectangles extracted by the plurality extracting unit 202d each include one or both of a horizontal line and a vertical line, each of the horizontal line and the vertical line constituting a segment in a multiple-segment character. The target area extracting unit 202e thereby extracts the circumscribed rectangle that includes one or both of the horizontal line and the vertical line as a target area for numeral identification (step SF-6).

The display area isolating unit 202f isolates a date display area from the date recognition target range so as to include the target area in a predetermined direction (step SF-7).

The perpendicularly isolating unit 202g identifies, in the date display area, both extreme positions in a predetermined direction as a target for numeral identification and isolates, at the both extreme positions, an isolated date display area perpendicularly to the predetermined direction (step SF-8).

The numeral identifying unit 202i performs a histogram on the date display area data of the isolated date display area using a plurality of lines and identifies a numeral (date) on the basis of a peak count in each of the lines (step SF-9).

The control unit 202 determines whether the numeral identification has been successful (step SF-10).

If the control unit 202 determined that the numeral identification has not been successful (No at step SF-10), the control unit 202 changes the parameters (for example, the thresholds based on luminance and hue) and shifts the processing to step SF-4.

If the control unit 202 determined that the numeral identification has been successful (Yes at step SF-10), the processing is shifted to step SF-11.

The numeral data assigning unit 202k assigns the date data of the numeral identified by the numeral identifying unit 202i to the image data of the captured image (step SF-11), and terminates the processing.

Other Embodiments

The embodiment of the present invention is explained above. However, the present invention may be implemented in various different embodiments other than the embodiment described above within a technical scope described in claims.

For example, the image-processing apparatus 200 may perform processing in a stand-alone configuration, in which the image-processing apparatus 200 can be configured to perform processes in response to request from a client terminal (having a housing separate from the image-processing apparatus 200) and return the process results to the client terminal.

All the automatic processes explained in the present embodiment can be, entirely or partially, carried out manually. Similarly, all the manual processes explained in the present embodiment can be, entirely or partially, carried out automatically by a known method.

Additionally, The process procedures, the control procedures, specific names, information including registration data for each process and various parameters such as search conditions, display examples, and database construction, mentioned in the description and drawings can be changed as required unless otherwise specified.

The constituent elements of the image-processing apparatus 200 and the external device 400 are merely conceptual and may not necessarily physically resemble the structures shown in the drawings.

For example, the process functions performed by each device of the image-processing apparatus 200 and the external device 400, especially each process function performed by the control unit 202, can be entirely or partially realized by a CPU and a computer program executed by the CPU or by hardware using wired logic.

The computer program, recorded on a non-transitory computer readable recording medium including programmed commands for causing a computer to execute the method of the present invention, can be mechanically read by the image-processing apparatus 200 as the situation demands. In other words, the storage unit 206 such as read-only memory (ROM) or hard disk drive (HDD) stores the computer program that can work in coordination with an operating system (OS) to issue commands to the CPU and cause the CPU to perform various processes. The computer program is first loaded to the random access memory (RAM), and forms the control unit in collaboration with the CPU.

Alternatively, the computer program can be stored in any application program server connected to the image-processing apparatus 200 and the external device 400 via a certain network, and can be fully or partially loaded as the situation demands.

The computer program may be stored in a computer-readable recording medium, or may be structured as a program product. Here, the "recording medium" includes any "portable physical medium" such as a memory card, a USB (Universal Serial Bus) memory, an SD (Secure Digital) card, a flexible disk, an optical disk, a ROM, an EPROM (Erasable Programmable Read Only Memory), an EEPROM (Electronically Erasable and Programmable Read Only Memory), a CD-ROM (Compact Disk Read Only Memory), an MO (Magneto-Optical disk), a DVD (Digital Versatile Disk), and a Blu-ray (registered trademark) Disc.

The computer program refers to a data processing method written in any computer language and written method, and can have software codes and binary codes in any format. The computer program can include, not only those individually configured, but also those having a dispersed form in the form of a plurality of modules or libraries, or can perform various functions in collaboration with a different program such as the OS. Any known configuration in each device according to the embodiment can be used for reading the recording medium. Similarly, any known process procedure for reading or installing the computer program can be used.

Various databases stored in the storage unit 206 is a storage unit such as a memory device such as a RAM or a ROM, a fixed disk device such as a HDD, a flexible disk, and an optical disk, and may store therein various programs, tables, databases, and web page files used for providing various processing or web sites.

The image-processing apparatus 200 may be structured as an information processing apparatus such as known personal computers or workstations, or may be structured by connecting any peripheral devices to the information processing apparatus. Furthermore, the image-processing apparatus 200 may be realized by mounting software (including programs, data, or the like) for causing the information processing apparatus to implement the method according of the invention.

The distribution and integration of the device are not limited to those illustrated in the figures. The device as a whole or in parts can be functionally or physically distributed or integrated in an arbitrary unit according to various attachments or how the device is to be used. That is, any embodiments described above can be combined when implemented, or the embodiments can selectively be implemented.

In accordance with the disclosure, accurate recognition of only a numeral allows noise to be removed and the numeral display area (numeral display position) to be identified. As a result, the disclosure allows the recognition range to be narrowed down according to the numeral display position, so that subsequent processing can be performed at higher speeds and cases of false recognition can be reduced.

Specifically, in accordance with the present disclosure, only a numeral can be accurately recognized in a multiple-segment character, such as a seven-segment character, a 14-segment character, or a 16-segment character, to thereby remove noise, so that an area in which a numeral is printed can be identified. As a result, the present disclosure allows the recognition range to be narrowed down to only a range in which the numeral is indicated. An amount of calculations required in subsequent processing can thus be reduced to make the processing speedier and reduce the cases of false recognition.

The present disclosure, when recognizing a numeral included in an image of, for example, a photo, a video, a digital clock, an electric scoreboard, a signboard, an electronic calculator, a handwritten mark sheet, and the like, can remove noise, reduce an amount of calculations by identifying a numeral display area, and achieve faster processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-processing apparatus comprising:
    a central processing unit (CPU) programmed to implement:
        a target range identifying unit that identifies a numeral recognition target range in an image;
        a rectangle extracting unit that extracts, when a circumscribed rectangle of a numeral likelihood portion conforms to a reference size defined by a number of pixels in a width direction and a number of pixels in a height direction, the circumscribed rectangle, wherein the numeral likelihood portion is likely to represent a numeral recognition target range;
        a plurality extracting unit that extracts, when a plurality of circumscribed rectangles extracted by the rectangle extracting unit is arrayed, the arrayed circumscribed rectangles;
        a target area extracting unit that determines whether the circumscribed rectangles extracted by the plurality extracting unit each includes one or both of a horizontal line and a vertical line, each of the horizontal line and the vertical line constituting a segment in a multiple-segment character, and extracts, as a target area for numeral identification, the circumscribed rectangle that includes one or both of the horizontal line and the vertical line; and
        a display area isolating unit that isolates a numeral display area from the numeral recognition target range so as to include the target area in a predetermined direction.

2. The image-processing apparatus according to claim 1, wherein, when the circumscribed rectangles having an identical height or width are arrayed, the plurality extracting unit extracts the circumscribed rectangles having the identical height or width.

3. The image-processing apparatus according to claim 1, wherein, when a plurality of groups of the circumscribed rectangles having an identical height or width is arrayed, the plurality extracting unit extracts the circumscribed rectangles included in each group.

4. The image-processing apparatus according to claim 1, further comprising:
    a perpendicularly isolating unit that identifies, in the numeral display area, both extreme positions in the predetermined direction as a target for numeral identification and isolates, at the both extreme positions, an isolated numeral display area perpendicularly to the predetermined direction.

5. The image-processing apparatus according to claim 4, wherein, when the numeral display area includes an area in which one or both of a number of the circumscribed rectangles and a distance between the circumscribed rectangles satisfy predetermined values, the perpendicularly isolating unit identifies, as the both extreme positions, the circumscribed rectangles in the area that are disposed at both extremes in the predetermined direction and isolates the isolated numeral display area perpendicularly to the predetermined direction at the both extreme positions.

6. The image-processing apparatus according to claim 4, wherein, when one or both of a predetermined prefix and a predetermined suffix are present in the numeral display area, the perpendicularly isolating unit identifies the both extreme positions on a basis of one or both of the prefix and the suffix and isolates the isolated numeral display area perpendicularly to the predetermined direction at the both extreme positions.

7. The image-processing apparatus according to claim 4, wherein, when a predetermined delimiter is present in the numeral display area, the perpendicularly isolating unit identifies the both extreme positions on a basis of the delimiter and isolates the isolated numeral display area perpendicularly to the predetermined direction at the both extreme positions.

8. The image-processing apparatus according to claim 1, wherein the target range identifying unit searches for a rectangular range included in the image to identify the rectangular range as the numeral recognition target range.

9. The image-processing apparatus according to claim 1, wherein the target range identifying unit identifies, in the image, a specified range specified by a user or a predetermined set range as the numeral recognition target range.

10. The image-processing apparatus according to claim 1, wherein the target area extracting unit determines whether the circumscribed rectangles extracted by the plurality extracting unit each includes a horizontal line that constitutes an upper-end, middle, or lower-end segment of the multiple-segment character and extracts a circumscribed rectangle that includes the horizontal line as the target area for numeral identification for numerals 0 and 2 to 9.

11. The image-processing apparatus according to claim 1, wherein, when a circumscribed rectangle conforms to the reference size set for numeral 1, the target area extracting unit further extracts the circumscribed rectangle as the target area for numeral identification for numeral 1.

12. The image-processing apparatus according to claim 1, further comprising:
    a numeral display area storage unit that stores numeral display area data of the numeral display area in an image in which the numeral display area is identified;
    a continuous recognition area isolating unit that isolates, as a continuous recognition area, an area that corresponds, in an image in which the numeral display area is not identified, to the numeral display area based on the numeral display area data stored in the numeral display area storage unit; and
    a continuous numeral identifying unit that identifies the numeral from the continuous recognition area.

13. The image-processing apparatus according to claim 1, further comprising:
    a binarizing unit that binarizes numeral recognition target range data of the numeral recognition target range using a threshold based on luminance and hue, to acquire binarizing range data,
    wherein the rectangle extracting unit:
        performs a labeling process to the binarizing range data to extract, in the binarizing range based on the binarizing range data, the numeral likelihood portion, and
        when the size of the circumscribed rectangle of the numeral likelihood portion conforms to the reference size, extracts the circumscribed rectangle.

14. The image-processing apparatus according to claim 1, further comprising:
a numeral identifying unit that identifies the numeral from the numeral display area.

15. The image-processing apparatus according to claim 14, wherein the numeral identifying unit performs a histogram on the numeral display area data of the numeral display area using a plurality of lines and identifies the numeral on a basis of a peak count in each of the lines.

16. The image-processing apparatus according to claim 14, wherein the numeral identifying unit identifies the numeral from the numeral display area through OCR.

17. A date identification apparatus comprising:
a central processing unit (CPU) programmed to implement:
   a target range identifying unit that identifies a date recognition target range in an image;
   a binarizing unit that binarizes date recognition target range data of the date recognition target range using a threshold based on luminance and hue, to acquire binarizing range data;
   a rectangle extracting unit that performs a labeling process to the binarizing range data to extract, in a binarizing range based on the binarizing range data, a numeral likelihood portion that is likely to represent a numeral and, when a circumscribed rectangle of the numeral likelihood portion conforms to a reference size defined by a number of pixels in a width direction and a number of pixels in a height direction, extracts the circumscribed rectangle;
   a plurality extracting unit that extracts, when a plurality of circumscribed rectangles extracted by the rectangle extracting unit is arrayed, the arrayed circumscribed rectangles;
   a target area extracting unit that determines whether the circumscribed rectangles extracted by the plurality extracting unit each includes one or both of a horizontal line and a vertical line, each of the horizontal line and the vertical line constituting a segment in a multiple-segment character, and extracts as a target area for numeral identification the circumscribed rectangle that includes one or both of the horizontal line and the vertical line;
   a display area isolating unit that isolates a date display area from the date recognition target range so as to include the target area in a predetermined direction;
   a numeral identifying unit that performs a histogram on date display area data of the date display area using a plurality of lines and identifies the numeral on a basis of a peak count in each of the lines; and
   a numeral data assigning unit that assigns date data of the numeral to image data of the image.

18. An image processing method comprising:
a target range identifying step of identifying a numeral recognition target range in an image;
a rectangle extracting step of extracting, when a circumscribed rectangle of a numeral likelihood portion conforms to a reference size defined by a number of pixels in a width direction and a number of pixels in a height direction, the circumscribed rectangle, wherein the numeral likelihood portion is likely to represent a numeral recognition target range;
a plurality extracting step of extracting, when a plurality of circumscribed rectangles extracted at the rectangle extracting step is arrayed, the arrayed circumscribed rectangles;
a target area extracting step of determining whether the circumscribed rectangles extracted at the plurality extracting step each includes one or both of a horizontal line and a vertical line, each of the horizontal line and the vertical line constituting a segment in a multiple-segment character, and extracting, as a target area for numeral identification, the circumscribed rectangle that includes one or both of the horizontal line and the vertical line; and
a display area isolating step of isolating a numeral display area from the numeral recognition target range so as to include the target area in a predetermined direction.

19. A computer program product having a non-transitory tangible computer readable medium including programmed instructions for causing, when executed by a computer, the computer to perform an image-processing method comprising:
a target range identifying step of identifying a numeral recognition target range in an image;
a rectangle extracting step of extracting, when a circumscribed rectangle of a numeral likelihood portion conforms to a reference size defined by a number of pixels in a width direction and a number of pixels in a height direction, the circumscribed rectangle, wherein the numeral likelihood portion is likely to represent a numeral recognition target range;
a plurality extracting step of extracting, when a plurality of circumscribed rectangles extracted at the rectangle extracting step is arrayed, the arrayed circumscribed rectangles;
a target area extracting step of determining whether the circumscribed rectangles extracted at the plurality extracting step each includes one or both of a horizontal line and a vertical line, each of the horizontal line and the vertical line constituting a segment in a multiple-segment character, and extracting, as a target area for numeral identification, the circumscribed rectangle that includes one or both of the horizontal line and the vertical line; and
a display area isolating step of isolating a numeral display area from the numeral recognition target range so as to include the target area in a predetermined direction.

* * * * *